US009184467B2

(12) United States Patent
Tikhonov et al.

(10) Patent No.: US 9,184,467 B2
(45) Date of Patent: **\*Nov. 10, 2015**

(54) LOW MOLECULAR WEIGHT SALTS COMBINED WITH FLUORINATED SOLVENTS FOR ELECTROLYTES

(71) Applicant: A123 Systems LLC, Waltham, MA (US)

(72) Inventors: Konstantin Tikhonov, Pleasanton, CA (US); Ka Ki Yip, San Leandro, CA (US); Tzu-Yuan Lin, San Jose, CA (US); Norman Lei, San Francisco, CA (US); Guillermo Guerrero-Zavala, San Jose, CA (US); Kristie W. Kwong, San Francisco, CA (US)

(73) Assignee: A123 Systems LLC, Waltham, MA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 13/910,098

(22) Filed: Jun. 4, 2013

(65) Prior Publication Data

US 2013/0337339 A1    Dec. 19, 2013

Related U.S. Application Data

(60) Provisional application No. 61/690,155, filed on Jun. 19, 2012.

(51) Int. Cl.
*H01M 6/16* (2006.01)
*H01M 10/0569* (2010.01)
(Continued)

(52) U.S. Cl.
CPC ........ *H01M 10/0569* (2013.01); *H01M 10/052* (2013.01); *H01M 10/0525* (2013.01);
(Continued)

(58) Field of Classification Search
CPC .............. H01M 10/056; H01M 2300/0034; H01M 2300/0037; H01M 2300/0045
See application file for complete search history.

(56) References Cited

U.S. PATENT DOCUMENTS 6,210,835 B1    4/2001  Arai
6,893,774 B2    5/2005  Schmidt et al.
(Continued)

FOREIGN PATENT DOCUMENTS

EP      1879252 A1       1/2008
JP      11-329491      \* 11/1999
WO      2009078668 A2    6/2009

OTHER PUBLICATIONS

English machine translation of Sakaguchi JP 11-329491.\*
(Continued)

*Primary Examiner* — Ula C Ruddock
*Assistant Examiner* — Lisa S Park
(74) *Attorney, Agent, or Firm* — Alleman Hall McCoy Russell & Tuttle LLP

(57) ABSTRACT

Provided are electrochemical cells and electrolytes used to build such cells. An electrolyte includes at least one salt having a molecular weight less than about 250. Such salts allow forming electrolytes with higher salt concentrations and ensure high conductivity and ion transport in these electrolytes. The low molecular weight salt may have a concentration of at least about 0.5M and may be combined with one or more other salts, such as linear and cyclic imide salts and/or methide salts. The concentration of these additional salts may be less than that of the low molecular weight salt, in some embodiments, twice less. The additional salts may have a molecular weight greater than about 250. The electrolyte may also include one or more fluorinated solvents and may be capable of maintaining single phase solutions at between about −30° C. to about 80° C.

21 Claims, 6 Drawing Sheets

(51) Int. Cl.
*H01M 10/0567* (2010.01)
*H01M 10/0568* (2010.01)
*H01M 10/0525* (2010.01)
*H01M 10/052* (2010.01)

(52) U.S. Cl.
CPC ...... *H01M10/0567* (2013.01); *H01M 10/0568* (2013.01); *H01M 2300/0034* (2013.01); *H01M 2300/0037* (2013.01); *Y02E 60/122* (2013.01)

(56) References Cited

U.S. PATENT DOCUMENTS

| | | | | |
|---|---|---|---|---|
| 7,022,878 | B2 | 4/2006 | Arai et al. | |
| 7,476,468 | B1* | 1/2009 | Lam et al. | 429/326 |
| 7,675,737 | B1* | 3/2010 | Smith et al. | 361/523 |
| 2001/0010877 | A1 | 8/2001 | Arai | |
| 2004/0197650 | A1 | 10/2004 | Kubota et al. | |
| 2006/0063073 | A1* | 3/2006 | Kawashima et al. | 429/246 |
| 2008/0160419 | A1 | 7/2008 | Segawa et al. | |
| 2009/0325076 | A1* | 12/2009 | Matsui et al. | 429/326 |
| 2011/0200874 | A1 | 8/2011 | Ono et al. | |
| 2011/0229769 | A1 | 9/2011 | Ihara et al. | |
| 2011/0300439 | A1* | 12/2011 | Iwaya | 429/200 |

OTHER PUBLICATIONS

Arai, Juichi, "Nonflammable Methyl Nonafluorobutyl Ether for Electrolyte Used in Lithium Secondary Batteries", Journal of the Electrochemical Society, vol. 150 (2), 2003, pp. A219-A228.

Arai, Juichi, et al., "Binary Mixed Solvent Electrolytes Containing Trifluoropropylene Carbonate for Lithium Secondary Batteries", Journal of the Electrochemical Society, vol. 149 (2), 2002, pp. A217-A226.

Nagasubramanian, Ganesan, et al., "Hydrofluoroether electrolytes for lithium-ion batteries: Reduced gas decomposition and nonflammable", Journal of Power Sources, vol. 196, 2011, pp. 8604-8609.

Naoi, Katsuhiko, et al., Discharge Behavior and Rate Performances of Lithium-Ion Batteries in Nonflammable Hydrofluoroethers (II), Journal of the Electrochemical Society, vol. 157 (2), 2010, pp. A190-A195.

Naoi, Katsuhiko, et al., "Nonflammable Hydrofluoroether for Lithium-Ion Batteries: Enhanced Rate Capability, Cyclability, and Low-Temperature Performance", Journal of the Electrochemical Society, vol. 156 (4), pp. A272-A276.

"U.S. Appl. No. 13/910,105, First Action Interview Pilot Program mailed Oct. 10, 2013", 5 pgs.

"U.S. Appl. No. 13/910,108, First Action Interview Pilot Program mailed Nov. 7, 2013", 4 pgs.

"Int'l Application Serial No. PCT/US2013/043955, Search Report & Written Opinion mailed Sep. 5, 2013", 7 pgs.

\* cited by examiner

LOW MOLECULAR WEIGHT SALTS COMBINED WITH FLUORINATED SOLVENTS FOR ELECTROLYTES

CROSS-REFERENCE TO RELATED APPLICATIONS

This application claims the benefit under 35 U.S.C. §119(e) of U.S. Provisional Patent Application 61/690,155, entitled: "ELECTROCHEMICAL CELLS AND RELATD COMPOUNDS" filed on Jun. 19, 2012, which is incorporated herein by reference in its entirety.

GOVERNMENT LICENSE RIGHTS

This invention was made with government support under DE-SC0005117 awarded by the Department of Energy. The government has certain rights in the invention.

BACKGROUND

Significant work has been directed to the performance improvement of electrochemical cells. Specifically, safety, overall capacity, cycle life, and operation conditions of the cells have been considered and extensively studied. Improving some of these characteristics often results in deteriorating other ones. For example, increase in capacity and charge-discharge rates may deteriorate safety performance. Selection of electrolytes or, more specifically, various electrolyte components has significant impact on these characteristics. Some of the desirable electrolyte properties include high ionic mobility and low viscosity, electrochemically stability at operating potentials, ability to maintain a single phase at wide range of temperatures, and being non-flammable at relative high temperatures.

SUMMARY

Provided are electrochemical cells and electrolytes used to build such cells. An electrolyte includes at least one salt having a molecular weight less than about 250. Such salts allow forming electrolytes with higher salt concentrations and ensure high conductivity and ion transport in these electrolytes. The low molecular weight salt may have a concentration of at least about 0.5M and may be combined with one or more other salts, such as linear and cyclic imide salts and/or methide salts. The concentration of these additional salts may be less than that of the low molecular weight salt, in some embodiments, twice less. The additional salts may have a molecular weight greater than about 250. The electrolyte may also include one or more fluorinated solvents and may be capable of maintaining single phase solutions at between about −30° C. to about 80° C.

In some embodiments, an electrolyte for use in an electrochemical cell includes a first electrolyte salt having a concentration of at least about 0.5M and a molecular weight less than about 250. This salt may be referred to as a low molecular weight salt. As noted, the low molecular weight of the salt allows using this salt at a higher concentration than, for example, salts with higher molecular weight. However, specific solvents may be needed to ensure solubility of the low molecular weight salt. In some embodiments, the electrolyte include one or more fluorinated solvents, such as 1,1,1,2,3,3-hexafluoro-4-(1,1,2,3,3,3-hexafluoropropoxy)-pentane at a concentration of at least about 20% by weight excluding a weight of the electrolyte salt. Furthermore, the electrolyte may include a non-fluorinated solvent, such as an ester, an ether, and/or a carbonate. The electrolyte is formulated such that it remains as a one-phase solution at the temperature ranging from about −30° C. to about 80° C.

In some embodiments, the electrolyte also includes one or more additional fluorinated solvents, such as 1-methoxyheptafluoropropane, methyl nonafluorobutyl ether, ethyl nonafluorobutyl ether, 1,1,1,2,2,3,4,5,5,5-decafluoro-3-methoxy-4-(trifluoromethyl)-pentane, and 3-ethoxy-1,1,1,2,3,4,4,5,5,6,6,6-dodecafluoro-2-trifluoromethyl-hexane. The concentration of these one or more additional fluorinated solvents may be less than the concentration of 1,1,1,2,3,3-hexafluoro-4-(1,1,2,3,3,3-hexafluoropropoxy)-pentane. In some embodiments, the overall concentration of all fluorinated solvents in the electrolyte is between about 30% and 80% by weight excluding a weight of the electrolyte salt. The fluorinated solvent may have a dynamic viscosity ranging from about 0.3 cP to about 5.0 cP.

The first electrolyte salt may include one of $LiPF_6$, $LiBF_4$, $LiClO_4$, LiBOB, or $LiN(SO_2F)_2$. In some embodiments, the electrolyte also includes a second electrolyte salt. The second electrolyte salt is different from the first electrolyte salt and has a lower concentration than the first electrolyte salt. The second electrolyte salt may include at least one carbon atom and at least two fluoride atoms and may be one of fluoroalkyl-substituted $LiPF_6$ salts, fluoroalkyl-substituted $LiBF_4$ salts, linear imide salts, cyclic imide salts, and methide salts. The fluoroalkyl-substituted $LiPF_6$ salts may have a general structure $LiPF_xR_{1-x}$, such that x is from 1 to 5 and at least one R is a fluorinated alkyl having a chain length of from 1 to 8. The fluoroalkyl-substituted $LiBF_4$ salts may have a general structure $LiBF_xR_{1-x}$, such that x is from 1 to 4 and at least one R is a fluorinated alkyl having a chain length of from 1 to 8. The linear imide salts may have have a general structure $LiN(-SO_2-R)_2$, such that at least one R is a fluorinated alkyl having a chain length of from 1 to 8. The cyclic imide salts may have a general structure $LiN(-SO_2-R-)$ such that R is fluorinated alkyl having a chain length of from 1 to 8. Finally, methide salts may have a general structure $LiC(-SO_2-R)_3$, such that at least one R is fluorinated alkyl with a chain length of from 1 to 8. In some embodiments, the second electrolyte salt is one of $LiN(SO_2CF_2CF_3)_2$, $LiN(SO_2CF_3)_2$, $LiN(SO_2F)_2$, $LiC(SO_2CF_3)_3$, or $LiC(SO_2CF_2CF_3)_3$. More specifically, the second electrolyte salt includes $LiN(SO_2CF_2CF_3)_2$.

In some embodiments, the non-fluorinated solvent is one of diethyl carbonate, dimethyl carbonate, ethyl methyl carbonate, methyl propyl carbonate, methyl acetate, ethyl acetate, methyl propionate, ethyl propionate, methyl butyrate, or ethyl butyrate. The non-fluorinated solvent may have a dynamic viscosity ranging from 0.3 cP to 2.0 cP. The electrolyte may have a conductivity ranging from about 0.1 mS to about 10 mS.

In some embodiments, the electrolyte also includes a flame-retardant additive. The flame-retardant additive may be present at a concentration ranging from about 1% to about 10% by weight. In some embodiments, the flame-retardant additive includes one of phosphates, phosphite, phosphines, or phosphazenes. The flame-retardant additive may be represented by a general formula $P_3N_3F_x(OR)_{6-x}$ such that R is an alkyl with a number of carbon atoms from 1 to 12, or R is an aromatic hydrocarbon, and wherein x is from 1 to 6. In some embodiments, the flame-retardant additive comprises a cyclic phosphazene.

In some embodiments, the electrolyte includes an ionic liquid present at a concentration ranging from about 1% to about 25% by weight. The ionic liquid may include one of pyridinium, peperridinium, imidazolium, and phosphonium ionic liquids.

In some embodiments, an electrolyte for use in an electrochemical cell includes a first electrolyte salt having a concentration of at least about 0.5M and having a molecular weight less than about 250. The electrolyte also includes one or more fluorinated solvents, such as 1,1,1,2,3,3-hexafluoro-4-(1,1,2,3,3,3-hexafluoropropoxy)-pentane having a concentration of at least about 20% by weight excluding a weight of the electrolyte salt. The electrolyte also includes ethyl butyrate or ethyl propionate being present at a concentration of between about 10% and 30% by weight excluding a weight of the electrolyte salt. Furthermore, the electrolyte includes a cyclic phosphazene present at a concentration of between about 5% and 15% by weight excluding a weight of the electrolyte salt.

Provided also is an electrochemical including a positive electrode, a negative electrode, an electrolyte providing ionic exchange between the positive electrode and negative electrode. Various examples of electrolytes are presented above. These and other embodiments are described further below with reference to the figures.

DETAILED DESCRIPTION

Figure 1:
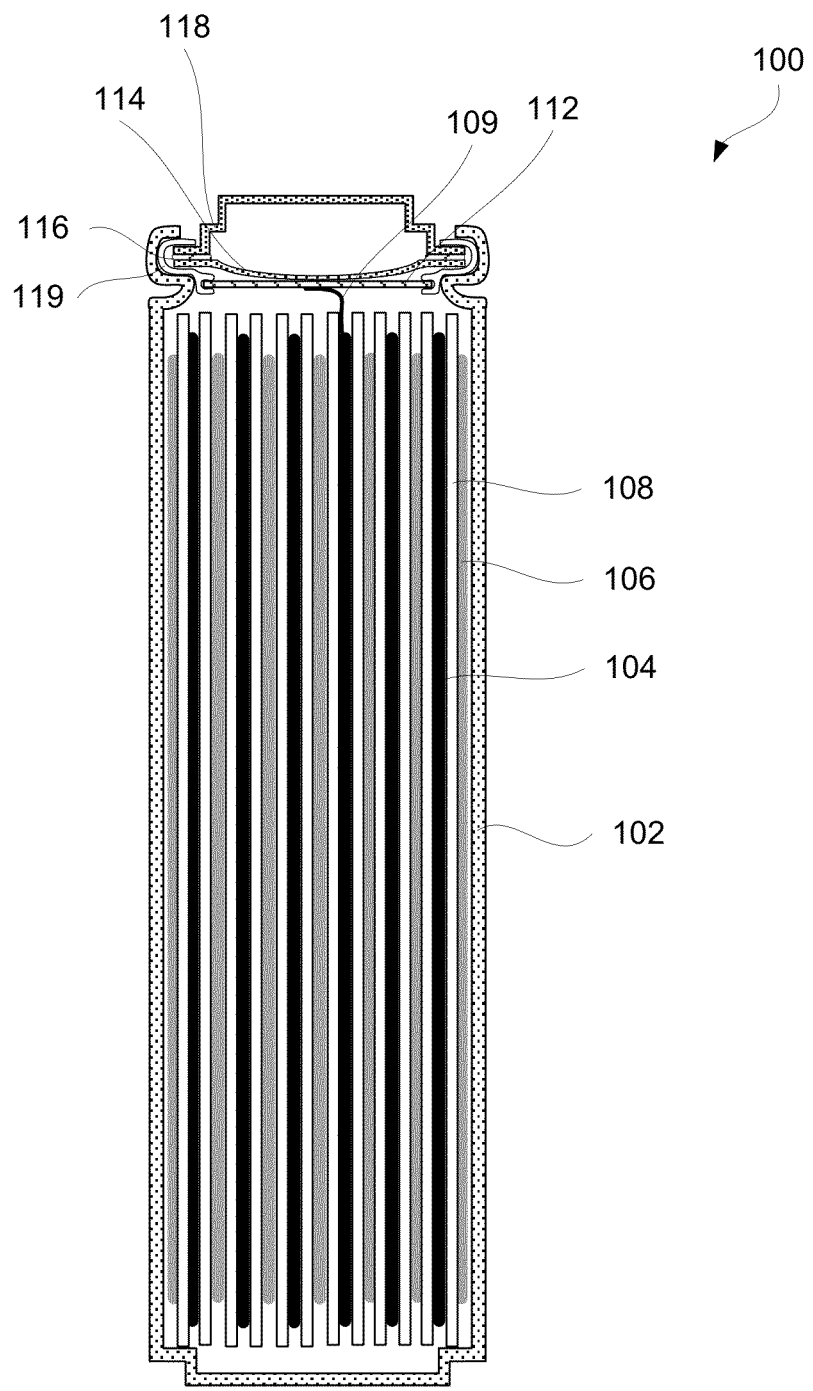
FIG. 1 is a schematic cross-sectional representation of an electrochemical cell, in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

INTRODUCTION

Conventional electrochemical cells are typically filled with electrolytes containing high amounts of carbonate based solvents, such as propylene carbonate (PC), ethylene carbonate (EC), diethyl carbonate (DEC), as well as dimethoxyethane (DME). In some cases, carbonate based solvents are the only solvents used in electrolytes. Such electrolytes exhibit high conductivity, low viscosity, and other desirable properties enumerated above. However, electrolytes containing large amounts (e.g., greater than 80% by weight excluding the weight of the salt) of carbonate based solvents have poor chemical stability and safety. Electrochemical cells built with these electrolytes can easily catch fire during various safety tests, such as overcharge, heating, nail penetration, and other tests. Such poor safety performance limits uses of electrochemical cells for some critical applications, such as aerospace, medical devices, and the like.

To improve safety characteristics of electrochemical cells, carbonate based solvents may be completely or at least partially replaced with less flammable electrolytes. For example, fluorinated solvents having a general formula of $C_xF_yH_zO_i$ (with x being an integer ranging from 3 to 15, y being an integer ranging from 1 to 30, z being an integer ranging from 0 to 15, and i being an integer ranging from 1 to 5) may be used. In some embodiments, fluorinated solvents may be present at a concentration of concentration of between about 30% and 80% by weight excluding a weight of the electrolyte salt in order to provide sufficient impact on the safety performance of the electrolyte.

However, non-flammable liquids (e.g., solvents) typically have small dipole moments and low dielectric constants resulting in poor solubility of electrolyte salts. Their salt dissociation capability may be also low as evidenced by low electrolyte conductivities. Furthermore, it may be difficult to combine various non-flammable liquids with other liquids that have larger dipole moments resulting in separation of these liquids into two phases, i.e., one phase containing a low-dipole moment non-flammable liquid and another phase containing a high-dipole moment liquid. It has been unexpectedly found that some liquids, which would otherwise not form a one-phase solution, may be combined in the electrolyte when a particular salt is present in the solution. Such electrolytes may stay as one phase solutions at temperatures ranging from about −30° C. to about 80° C. For example, fluoroalkyl-substituted $LiPF_6$ salts and fluoroalkyl-substituted $LiBF_4$ salts as well as linear imide salts, cyclic imide salts, and methide salts having fluorinated alkyl groups (with up to 8 carbon atoms) may be used.

From the safety point of view, fluorinated solvents are good alternatives to carbonate based solvents. Specifically, the fluorinated solvents tend to be less flammable than their non-fluorinated counterparts. For example, replacing one or more carbonates listed above with methoxy-nonafluoro butan in an electrolyte significantly reduced flammability of the electrolyte tested in a standard ignition test. Specific examples of fluorinated solvents are available from 3M Specialty Materials in St. Paul, Minn. and marketed as HFE-7000, HFE-7100, HFE-7200, HFE-7300, HFE-7500, and HFE-7600. These particular solvents do not have flash points. In addition to their lower flammability, the fluorinated solvents tend to be less toxic, have lower viscosity, and tend to be more stable when contacting lithium and when exposed to operating potentials of battery electrodes.

In general, the fluorinated solvents suitable for electrochemical cells include fluorinated carbonates, fluorinated esters, and fluorinated ethers. Some examples of fluorinated ethers include: perfluorobutyl methyl ether, perfluorobutyl ethyl ether, perfluoropentyl methyl ether, perfluoropentyl ethyl ether, perfluoroheptyl methyl ether, perfluoroheptyl ethyl ether. Other examples are listed in the corresponding section below. The fluorinated solvents may be expressed using the following formula: $C_xF_yH_zO_i$, in which x is an integer ranging from 3 to 15, y is an integer ranging from 1 to 30, z is an integer ranging from 0 to 15, and i is an integer ranging from 1 to 5.

The fluorinated solvents may be used at relative high concentrations (e.g., between about 30% and 80 by weight not accounting the weight of the electrolyte salts) without a risk of separating the electrolyte solutions when coupled with certain electrolyte salts. Without being restricted to any particular theory, the concentration of at least 30% is needed to have sufficient effects on flammability The salts typically include fluorinated groups, e.g., fluorinated alkyls having chain lengths from 1 to 8. Some examples of suitable fluorinated salts include fluoroalkyl-substituted $LiPF_6$ salts, fluoroalkyl-substituted $LiBF_4$ salts, linear and cyclic imides as well as methide salts including fluorinated alkyl groups. Specific examples include $LiN(SO_2CF_2CF_3)_2$ (i.e., LiBETI), $LiN(SO_2CF_3)_2$ (i.e., LiTFSI), and $LiN(SO_2F)_2$, (i.e., LiFSI). Additional examples are listed in the electrolyte salt section below. The concentration of the salts may be between about 0.1M and 3M or, more specifically, between 0.6M and 2.0M, such as 0.8-1.2M. The fluorinated salts are more soluble in the fluorinated solvents in comparison to their non-fluorinated counterparts.

Non-fluorinated solvents may be also added to the electrolytes to ensure solubility, conductivity, and other properties. In general, non-fluorinated esters, ethers, or carbonates may be used. Some specific example include diethyl carbonate (DEC), dimethyl carbonate (DMC), ethyl methyl carbonate (EMC), methyl propyl carbonate (MPC), methyl acetate (MA), ethyl acetate (EA), methyl propionate (MP), ethyl propionate (MP), methyl butyrate (MB), and ethyl butyrate (EB). Other examples of suitable carbonates include ethyl propyl carbonate, dipropyl carbonate, bis(trifluoroethyl) carbonate, bis(pentafluoropropyl) carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, and perfluorobutyl ethyl carbonate.

The concentration of the non-fluorinated solvents may be between about 1% and 50% by weight or, more specifically, between about 5% and 20% by weight not accounting the weight of the electrolyte salts. For purposes of this disclosure, all listed weight ratios exclude the weight of the electrolyte salts unless specifically noted otherwise. In some embodiments, the amount of all non-fluorinated solvents in an electrolyte solution is less than the amount of all fluorinated solvents in that solution. The weight ratio of all non-fluorinated solvents to all fluorinated solvents may be less than 0.9 or, more specifically, less than 0.5, less than 0.2, and even less than 0.1. In some embodiments, an electrolyte solution may be substantially free of non-fluorinated solvents.

In some embodiments, the electrolyte also includes one or more flame retardant additives. Some examples of flame retardant additives include phosphates, phosphites, phosphines, and phosphazenes (e.g., cyclic phosphazenes). In some embodiments, the composition of a flame-retardant additive is represented by the following formula: $P_3N_3F_x(OR)_{6-x}$, such that R is an alkyl with a number of carbon atoms from 1 to 12 or aromatic hydrocarbon and x is from 1 to 6. The concentration of the flame retardant additive may range between about 1% and 20% by weight or, more specifically, between about 5% and 10% by weight. Higher concentrations of the flame retardant additives may be desirable from the safety perspectives but may have negative impacts on cycling performance of a cell.

In some embodiments, the electrolyte also includes one or more ionic liquids. The one or more ionic liquids may be used to reduce the vapor pressure of the overall electrolyte solution. The one or more ionic liquids may be present at a concentration ranging between about 1% and 25% by weight or, more specifically, between 5% and 10% by weight. Some examples of the ionic liquids include pyridinium, peperridinium, imidazolium, and phosphonium ionic liquids.

The electrolyte may be formulated in such a way that it stays as a one-phase solution (also known as a single phase solution, a homogeneous solution, or simply a solution) at a temperature ranging from about −30° C. to about 80° C. In other words, the electrolyte does not separate into multiple phases, each having a different composition, within the above specified temperature. The one-phase solution retains its solution properties over the specified temperature range. As such, different components of the electrolyte are miscible within the specified temperature range. Without being restricted to any particular theory, it is believed that electrolyte salts are not only solvable within the solvents at this temperature range but also help to maintain all components within the single phase rather than allowing the components to separate.

The electrolytes may have a conductivity ranging from about 0.1 mS/cm to about 10 mS/cm. The conductivity of the electrolyte is a measure of how quickly lithium ions can move from one electrode to another electrode through the solution. Higher conductivity allows higher rates of charge and/or discharge and the above-recited conductivity range is comparable to conventional carbonate based electrolytes. As such, non-flammable electrolytes containing fluorinated solvents not only have improved safety characteristics but are also capable of maintaining required charge and discharge rates as further evidenced from experimental data presented below.

Furthermore, electrochemical cells build with non-flammable electrolytes exhibit stable cycling performance. In some embodiments, the initial capacity decreases by less than about 20% after 500 cycles performed at 40° C. or less than about 20% after 100 cycles at about 20° C. In specific test examples, the electrochemical cells fabricated using a graphite negative electrode and a nickel cobalt manganese (NCM) positive electrode were cycled from 3.0V to 4.2V. The cells were filled with a non-flammable electrolyte containing fluorinated solvent. Charge was performed at a 0.5 C rate (the current expressed in amperes being equal to 50% of a cell capacity in ampere-hours) to 4.2V, after which the voltage remains constant until current drops to C/20. Discharge was performed with 0.5 C constant current. A 15 min rest was used after each charge and discharge part of the cycle. In another example, cells included lithium iron phosphate (LFP) positive electrode and were cycled between 2.5V to 3.8V using the rates and cycling conditions described above. The cells were also filled with a non-flammable electrolyte containing fluorinated solvent. In other embodiments, cells included lithium titanate (LTO) negative electrode and lithium manganese oxide (LMO) positive electrode and were cycled between 1.5V and 2.7V with 1 C charge and 1 C discharge rates. Likewise, the cells were filled with a non-flammable electrolyte containing fluorinated solvent. All these cell examples demonstrated cycle life sufficient for many applications.

Without being restricted to any particular theory, it is believed that the fluorinated solvents may also help with forming more stable solid electrolyte interphase (SEI) layers on electrode surfaces particularly when used with active materials that exhibit high operating potentials or may be susceptible to mechanical stresses (e.g., increase and decrease in volume during cycling exhibited by silicon, tin, and germanium). Such SEI layers may be less resistive and, in some embodiments, may be more flexible. Flexibility of the SIE layer may be particularly useful for active materials that exhibit substantial swelling.

In some embodiments, an electrolyte may include a water scavenging compound to ensure stability of the electrolyte. The water scavenging compound may be used to ensure electrolyte stability. Specifically, many fluorine containing salts have been found to produce hydrofluoric acid when combined with water even with small amounts of water, such as traces of water commonly present in electrolyte components. Hydrofluoric acid can be damaging to various cell components. As such, moisture content within the electrolyte and other components of the cell may be controlled. Some example of moisture scavenging compounds include trialkyl substituted amines (such as diethylamino trimethyl-silane), lactams (such as 1-methyl-2-pyrrolidinone), carbodiimides (such as, N,N'-dicyclohexylcarbodiimide), amides (such as, dimethyl acetamide), carbamates (such as, fluorinated carbamate), phosphates (O=P(OR)$_3$) and phosphites (P(OR)$_3$) (such as tris(2,2,2-trifluoroethyl)phosphite and trimethyl phosphate), phosphazenes (such as, hexamethoxcyclo phosphazene (HMPN) and hexamethyl phosphoramide), various lithium salts (such as LiFAP: LiPF$_3$(CF$_2$CF$_3$)$_3$, LiBOB: LiB(C$_2$O$_4$)$_2$, LiFOB: LiB(F)$_2$(C$_2$O$_4$)$_2$, lithium tetrafluorooxalatophosphate LiPF$_4$(C$_2$O$_4$), lithium tetrakis(pentafluorophenyl)borate), carbonates (such as lithium carbonate and sodium carbonate), and lithium fluoride.

Each of these electrolyte components, electrolyte formulations, and electrochemical cells using these formulations will now be described in more details.

Examples of Electrolyte Salts

Electrolyte salts are used in electrolytes as sources of ions. Other functions of the electrolyte salts may include maintaining stability of the electrolyte solution, such as preserving the solution as a phase solution. Specific selection of electrolyte salts and their concentrations ensures solubility of the salts in the electrolyte solutions. The salts may be present at a total molar concentration of between about 0.1M to about 3M or, more specifically, between about 0.5M to about 2.0M or, even more specifically, at about 0.75M to about 1.5M. At lower concentrations, the salts may not supply adequate amount of ions, while higher concentrations are generally limited by solubility limits and other considerations. It should be noted that the same electrolyte may include multiple salts. For example, between about 0.1M-0.3M LiN(SO$_2$CF$_3$)$_2$ (also known as LiTFSI) may be combined with 0.7M-0.9M LiPF$_6$. In another example, 0.1M-0.2M LiPF$_6$ may be combined with 0.6M-0.7M LiN(SO$_2$CF$_2$CF$_3$)$_2$ (also known as LiBETI). Furthermore, 0.9M-1.1M LiBF$_4$ may be combined with 0.1M-0.2M LiTFSI, or 0.1M-0.3M LiTFSI may be combined with 0.5M-0.7M LiBETI. In some embodiments, LiPF$_6$ or LiBF$_4$ may be combined with both LiTFSI and LiBETI.

The solubility of electrolyte salts depends on their structure and composition as well as on solvents used to form a solution. For example, fluorinated solvents are relatively non-polar compounds. To improve solubility of electrolyte salts in fluorinated solvents, the electrolyte salts may include one or more fluorinated alkyl groups. These groups are believed to improve solubility of these salts in fluorinated solvents and maintain one phase solutions, in particular, when the fluorinated solvents are combined with non-fluorinated solvents. It has been found that salts with smaller anions tend to have more difficulties in dissolving in these electrolytes. The experiments have shown that LiN(SO$_2$CF$_2$CF$_3$)$_2$ dissolves better in fluorinated ethers than, for example, LiN(SO$_2$CF$_3$)$_2$, while LiN(SO$_2$CF$_3$)$_2$ dissolves better than LiPF$_6$.

Experiments have been conducted to determine solubility of different salts in various electrolyte compositions. For example, it was found that a combination of solvents including 75% by weight of HFE-7100, 5% by weigh of ethylene carbonate (EC), and 20% by weight of ethyl-methyl carbonate (EMC) (i.e., HFE-7100:EC:EMC at 75:5:20) readily dissolves 1M LiBETI. However, the same combination of the solvents does not dissolve 1M LiPF$_6$, 1M LiBF$_4$, 1M LiClO$_4$, or 1M LiTFSI. The solubility does not change when HFE-7100 is replaced with HFE-7300 (HFE-7300:EC:EMC at 75:5:20 still dissolves 1M LiBETI, but not 1M LiPF$_6$, 1M LiBF$_4$, 1M LiClO$_4$, or 1M LiTFSI) or with HFE-7500 (HFE-7500:EC:EMC at 75:5:20 still dissolves 1M LiBETI, but not 1M LiPF$_6$, 1M LiBF$_4$, 1M LiClO$_4$, or 1M LiTFSI). However, a combination of HFE-7600:EC:EMC at 75:5:20 dissolves all these salts: 1M LiBETI, 1M LiPF$_6$, 1M LiBF$_4$, 1M LiClO$_4$, and 1M LiTFSI. As noted elsewhere in this document, fluorinated solvents HFE-7100, HFE-7300, HFE-7500, and HFE-7600 are available from 3M Specialty Materials in St. Paul, Minn. as fluids typically used for heat transfer.

Furthermore, substituting ethyl-methyl carbonate with ethylene propylene (EP) does not change solubility of combinations including HFE-7500. Specifically, HFE-7500:EC:EP at 75:5:20 does not dissolve 1M LiPF$_6$, 1M LiBF$_4$, 1M LiClO$_4$, or 1M LiTFSI. The combination including HFE-7600:EC:EP at 75:5:20 still dissolves 1M LiBETI. Yet, another set of experiments has been conducted to determine effects of the solvent ratios on the solubility. The combination of HFE-7300:EC:EMC at 60:10:30 still dissolves 1M LiBETI but not 1M LiPF$_6$, 1M LiBF$_4$, 1M LiClO$_4$, or 1M LiTFSI.

As such, solubility of electrolyte salts depends on both salts and solvents. Combining specific salts with specific solvents is essential not only to form an initial electrolyte but also to maintain this electrolyte as a one phase solution over a wide range of operating conditions.

Without being restricted to any particular theory, solubility of LiBETI may be attributed to the size of its fluorinated alkyl group. Specifically, LiBETI includes CF$_2$CF$_3$ group and is capable of forming solutions with methyl nanofluorobutyl ether (C$_4$F$_9$OCH$_3$). A similar imide salt, LiTFSI includes a shorter fluorinated alkyl, i.e., CF$_3$, is not capable forming a solution with this ether. It is believed that substituting, fluorine radicals (or other radicals) in various salts, such as LiPF$_6$ and LiBF$_4$, can be used to improve their solubility in fluorinated solvents.

In some embodiments, the electrolyte salt includes a fluorinated alkyl group that has a chain length of 1 to 8, such as CF$_3$, C$_2$F$_5$, C$_3$F$_7$, C$_4$F$_9$, C$_5$F$_{11}$, C$_6$F$_{13}$, C$_7$F$_{15}$, and C$_8$F$_{17}$. This includes fluorinated linear and non-linear alkyls. In many cases, the non-linear groups result in lower viscosity solutions. In some embodiments, all fluorinated alkyl groups of an electrolyte salt may be the same (e.g., LiN(SO$_2$C$_2$F$_5$)$_2$ or LiN(SO$_2$CF$_3$)$_2$). Alternatively, an electrolyte salt may have different fluorinated alkyl groups. In other words, when multiple fluorinated alkyl groups are present, these fluorinated alkyl groups may be independently selected.

In some embodiments, an electrolyte salt has a molecular weight of at least about 250 g/mol or, more specifically, of at least about 300 g/mol or, even more specifically, of at least about 600 g/mol. Salts including longer chains that have a high molecular weight may help with maintaining the electrolyte as a one phase solution. However, these salts are generally used for less concentrated solutions and may result in high viscosity solutions that limit the electrolyte transport properties. In some embodiments, electrolyte salt has a molecular weight of between about 250-1500 g/mol or, more specifically, between about 300-1000 g/mol.

Furthermore, the electrolyte salt may be resistant to oxidation and/or decomposition at electrode potentials of up to about 5.5V versus lithium reference electrode or, up to about 5.0V or, up to about 4.5V or even up to about 4.0V. LiTFSI, LiBETI, LiBF$_4$, LiPF$_6$ are examples of the salts stable up to at least 4.5V, whereas LiBOB and LiFSI may oxidized below 4.5V on the cathode surface.

In some embodiments, the electrolyte salt may include fluoroalkyl-substituted LiPF$_6$ salts, fluoroalkyl-substituted LiBF$_4$, linear and cyclic imide salts, and methide salts. Specifically, the electrolyte salt may be fluoroalkyl-substituted LiPF$_6$ salts having a general structure LiPF$_x$R$_{1-x}$, wherein x is from 1 to 5 and wherein at least one R is a fluorinated alkyl having a chain length of from 1 to 8. The remaining R(s) may be fluoride. Specific examples include LiPF$_5$C$_2$F$_5$, LiPF$_5$C$_4$F$_9$, LiPF$_5$C$_3$F$_7$, LiPF$_3$(C$_2$F$_5$)$_3$, LiPF$_3$(CF$_3$)$_3$, LiPF$_3$(C$_3$F$_7$)$_3$, LiPF$_3$(C$_4$F$_9$)$_3$, LiPF$_2$(C$_2$F$_5$)$_4$, LiPF(C$_2$F$_5$)$_5$, and other of a similar structure. In some embodiments, phosphorous in $LiPF_6$-type salts may be substituted with arsenic (As), antimony (Sb), or bismuth (Bi). A general formula of $LiXR_6$, in which X is one of phosphorous (P), arsenic (As), antimony (Sb), or bismuth (Bi), and R is one of $C_2F_5$ or F, represents a group of salts that are suitable for use with fluorinated solvents. Another group of salts contain one of phosphorous (P), arsenic (As), antimony (Sb), or bismuth (Bi), four fluorinated groups ($C_2F_5$ or F), and oxalate.

Another example of the electrolyte salt includes fluoroalkyl-substituted $LiBF_4$ salts having a general structure $LiBF_xR_{1-x}$, wherein x is from 1 to 4 and wherein at least one R is a fluorinated alkyl having a chain length of from 1 to 8. Specific examples include $LiBF_3CF_3$, $LiBF_3C_2F_5$, $LiBF_3C_3F_7$, $LiBF_3C_4F_9$, $LiBF_2(CF_3)_2$, $LiBF_2(C_2F_5)_2$, $LiBF_2(C_3F_7)_2$, $LiBF_2(C_4F_9)_2$ and others. Structural formulas of some boron containing salts are presented below, in which at least one R can be fluoride or a fluorinated alkyl with number of carbons from 1 to 15 or, more specifically, from 1 to 8. The remaining R(s) may be fluorine, hydrogen, or non-fluorinated alkyl groups.

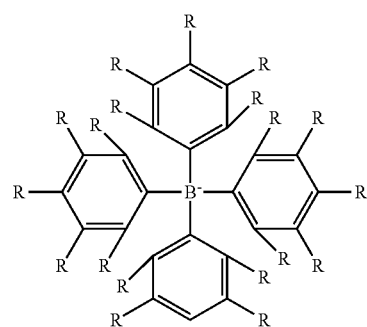

(Formula 1)

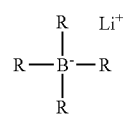

(Formula 2)

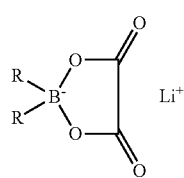

(Formula 3)

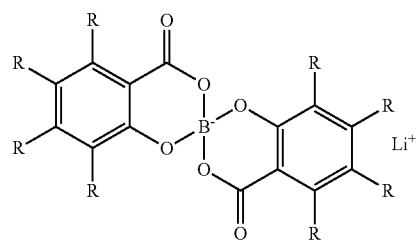

(Formula 4)

representing a lithium bis[salicylato(2-)]borate (LBSB)

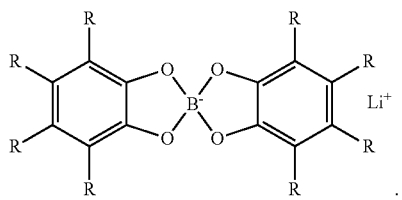

(Formula 5)

representing a cyclic sulfonyl borate

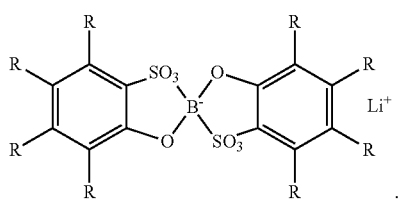

(Formula 6)

representing bis[1,2,-benzenediolato(2-)O,O']-borate(1-)

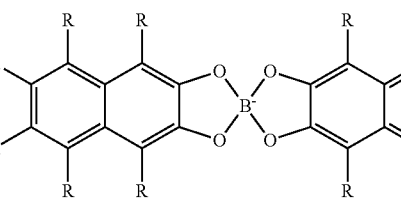

(Formula 7)

representing bis[2-olatobenzenesulfonato (2-)O,O']-borate (1-)

(Formula 8)

representing bis[2,3-naphthalenendiolato(2-)O,O']-borate (1-)

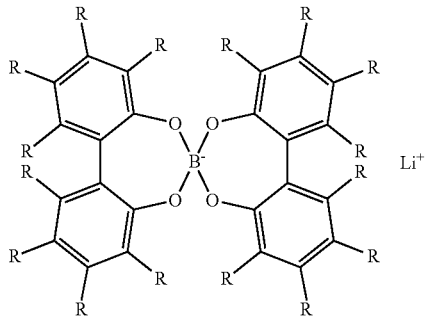
(Formula 9)

(Formula 10)

(Formula 11)

representing phenoxide (Formula 12)

representing 2,2-biphenoxide

A few other examples of suitable salts represented by the following formulas, in which at least one R can be fluoride or a fluorinated alkyl with number of carbons from 1 to 15 or, more specifically, from 1 to 8 and X can be N, P, As, Sb, or Bi. The remaining R(s) may be fluorine, hydrogen, or non-fluorinated alkyl groups.

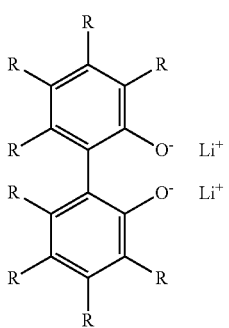
(Formula 13)

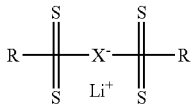
(Formula 14)

Furthermore, linear imide salts having a general structure $LiN(-SO_2-R)_2$, wherein at least one R is a fluoride atom or fluorinated alkyl having a chain length of from 1 to 8, may be used as electrolyte salts. The remaining R(s) may be fluorine or hydrogen or non-fluorinated alkyl groups. Specific examples include $LiN(SO_2CF_2CF_3)_2$ (i.e., LiBETI), $LiN(SO_2CF_3)_2$ (i.e., LiTFSI), and $LiN(SO_2F)_2$, (i.e., LiFSI), $LiN(SO_2CF_2 CF_2CF_3)_2$, $LiN(SO_2CF(CF_3)CF_3)_2$.

Furthermore, linear imide salts having a general structure $LiN(-SO_2-R)_2$, wherein at least one R is a fluoride atom or fluorinated alkyl having a chain length of from 1 to 8, may be used as electrolyte salts. The remaining R(s) may be fluorine, hydrogen, or non-fluorinated alkyl groups. Specific examples include $LiN(SO_2CF_2CF_3)_2$ (i.e., LiBETI), $LiN(SO_2CF_3)_2$ (i.e., LiTFSI), and $LiN(SO_2F)_2$, (i.e., LiFSI), $LiN(SO_2CF_2 CF_2CF_3)_2$, $LiN(SO_2CF(CF_3)CF_3)_2$.

Additional examples of the electrolyte salts include cyclic imide salts having a general structure $LiN(-SO_2-R-)$, wherein R is fluorinated alkyl having a chain length of from 1 to 8. The remaining R(s) may be fluorine, hydrogen, or non-fluorinated alkyl groups. Specific examples include $LiN(-SO_2CF_2CF_2CF_2CF_2-SO_2-)$, $LiN(-SO_2CF_2CF_2CF_2CF_2CF_2-SO_2-)$, $LiN(-SO_2CF_2CF_2CF_2CF_2CF_2CF_2-SO_2-)$.

Yet another examples include methide salts having a general structure $LiC(-SO_2-R)_3$, wherein at least one R is fluorinated alkyl with a chain length of from 1 to 8. The remaining R(s) may be fluorine, hydrogen, or non-fluorinated alkyl groups. Specific examples include $LiC(SO_2CF_3)_3$, $LiC(SO_2CF_2CF_3)_3$.

More generally, the electrolyte salt includes at least one carbon atom and at least two fluoride atoms and metal ions.

In some embodiments, an electrolyte salt may be represented by the following general formula: $R_f^1SO_2X^-(Li^+)YZ_a$, wherein $R_f^1$ is one of F, $CF_3$, $CF_2CF_3$, $CF_2CF_2CF_3$, $CF_2OCF_3$, $CF_2CF_2CF_2CF_3$, $CF_2OCF_2CF_3$, $CF_2CF_2OCF_3$, $CF_2OCF_2CF_2CF_3$, $CF_2CF_2OCF_2CF_3$, or $CF_2CF_2CF_2OCF_3$. X may be either carbon or nitrogen. When nitrogen is used (as X), no Z is present (i.e., a=0). However, when carbon s used, one Z is present and Y and Z are electron-withdrawing groups, each independently selected from a group consisting of CN, $SO_2R_f^2$, $SO_2R$, $P(O)(OR)_2$, $CO_2R$, $P(O)R_2$, $C(O)R_f^3$, C(O)R, cycloalkenyl groups formed therewith, and H, with the proviso that Y and Z cannot both be H. R may be a fluorinate or non-fluorinated alkyl group having a chain length of from 1 to 8. The R may include one or more oxygen atoms. Some examples include $CH_3$, $CH_2CH_3$, $CH_2OCH_3$, $CH(Ar)CH_3$, $CH_2CH_2-Ar$, $CH_2CH_2CH_3$, $CH_2OCH_2CH_3$, $CH_2CH_2OCH_3$, $CH(Ar)CH_2CH_3$, $CH_2CH(Ar)CH_3$, $CH_2CH_2CH_2-Ar$, $CH_2CH_2CH_2CH_3$, $CH_2OCH_2CH_2CH_3$, $CH_2CH_2OCH_2CH_3$, $CH_2CH_2CH_2OCH_3$, $CH(Ar)CH_2CH_3$, $CH_2CH(Ar)CH_3$, $CH_2CH_2CH(Ar)CH_3$, $CH_2CH_2CH_2CH_2-Ar$, $CH_2CH_2CH_2CH_2CH_3$, $CH_2OCH_2CH_2CH_2CH_3$, $CH_2CH_2OCH_2CH_2CH_3$, $CH_2CH_2CH_2OCH_2CH_3$, $CH_2CH_2CH_2CH_2OCH_3$, $CH(Ar)CH_2CH_2CH_3$, $CH_2CH(Ar)CH_2CH_3$, $CH_2CH_2CH(Ar)CH_3$, $CH_2CH_2CH_2CH_2CH_2-Ar$, $CH_2CH_2CH_2CH_2CH_3$, $CH_2OCH_2CH_2CH_2CH_2CH_3$, $CH_2CH_2OCH_2CH_2CH_2CH_3$, $CH_2CH_2CH_2OCH_2CH_2CH_3$, $CH_2CH_2CH_2CH_2OCH_2CH_3$, $CH_2CH_2CH_2CH_2CH_2OCH_3$, $CH(Ar)CH_2CH_2CH_2CH_3$, $CH_2CH(Ar)CH_2CH_2CH_2CH_3$, $CH_2CH_2CH(Ar)CH_2CH_2CH_3$, $CH_2CH_2CH_2CH(Ar)CH_2CH_3$, $CH_2CH_2CH_2CH_2CH(Ar)CH_3$, and $CH_2CH_2CH_2CH_2CH_2CH_2$—Ar. For purposes of this document, the term "Ar" represents an aromatic ring or fluorinated aromatic ring. $R_f^2$ and $R_f^3$ are independently selected from $CF_3$, $CF_2CF_3$, $CF_2CF_2CF_3$, $CF_2OCF_3$, $CF_2CF_2CF_2CF_3$, $CF_2OCF_2CF_3$, $CF_2CF_2OCF_3$, $CF_2OCF_2CF_2CF_3$, $CF_2CF_2OCF_2CF_3$, or $CF_2CF_2CF_2OCF_3$. When X is nitrogen and no Z is present (i.e., a=0), then Y may be $SO_2R_f^6$, wherein $R_f^6$ is $(R_f^4SO_2N^-(Li^+)SO_2)_mR_f^5$ with m being 0 or 1, $R_f^4$ being $CF_2$, $CF_2CF_2$, $CF_2CF_2CF_2$, $CF_2OCF_2$, $CF_2CF_2CF_2CF_2$, $CF_2OCF_2CF_2$, $CF_2CF_2OCF_2$, $CF_2OCF_2CF_2CF_2$, $CF_2CF_2OCF_2CF_2$, or $CF_2CF_2CF_2OCF_2$, $R_f^5$ is $CF_3$, $CF_2CF_3$, $CF_2CF_2CF_3$, $CF_2OCF_3$, $CF_2CF_2CF_2CF_3$, $CF_2OCF_2CF_3$, $CF_2CF_2OCF_3$, $CF_2OCF_2CF_2CF_3$, $CF_2CF_2OCF_2CF_3$, or $CF_2CF_2CF_2OCF_3$.

Examples of Fluorinated Solvents

As noted above, the electrolyte solution includes at least one fluorinated solvent. In some embodiments, multiple fluorinated solvents may be used in the same electrolyte solution. For example, one or more fluorinated ethers may be combined with one or more fluorinated carbonates and/or one or more fluorinated esters. In the same or other examples, one or more fluorinated esters may be combined with one or more fluorinated carbonates without any fluorinated ethers. Furthermore, one or more fluorinated solvents may be also combined with one or more non-fluorinated solvents in the same solution. Various examples of non-fluorinated solvents are described below.

Fluorinated solvents for use in electrolyte solutions may be represented by the following general formula: $C_xF_yH_zO_i$, such that X is an integer ranging from 3 to 15, Y is an integer ranging from 1 to 30, Z is an integer ranging from 0 to 15, and I is an integer ranging from 1 to 5. Specific classes of these fluorinated solvents include fluorinated esters, fluorinated ethers, and fluorinated carbonates. For example, 1-methoxyheptafluoropropane (available as HFE-7000 Engineering Fluid from 3M Specialty Materials in St. Paul, Minn.), methyl nonafluorobutyl ether (available as HFE-7100 Engineering Fluid from 3M Specialty Materials), ethyl nonafluorobutyl ether (available as HFE-7200 Engineering Fluid from 3M Specialty Materials), 1,1,1,2,2,3,4,5,5,5-decafluoro-3-methoxy-4-(trifluoromethyl)-pentane (available as HF-7300 Engineering Fluid from 3M Specialty Materials), 3-ethoxy-1,1,1,2,3,4,4,5,5,6,6,6-dodecafluoro-2-trifluoromethyl-hexane (available as HFE-7500 Engineering Fluid from 3M Specialty Materials), and 1,1,1,2,3-hexafluoro-4-(1,1,2,3,3,3-hexafluoropropoxy)-pentane (available as HFE-7600 Engineering Fluid from 3M Specialty Materials) may be used. Some physical properties of these six fluorinated ethers are presented in the table below.

TABLE

Selected Physical Properties of Six Fluorinated Ethers.

| Solvent | m.p. (° C.) | b.p. (° C.) | Viscosity (cp) | dielectric constant | MW | density (g/ml) | Vapor Pressure mm Hg @ 20° C. |
|---|---|---|---|---|---|---|---|
| HFE-7000 | −122.5 | 34 | 0.45 | 7.4 | 200 | 1.4 | 400 |
| HFE-7100 | −135 | 61 | 0.61 | N/A | 250 | 1.52 | 202 |
| HFE-7200 | −138 | 76 | 0.61 | N/A | 264 | 1.43 | 109 |
| HFE-7300 | −38 | 98 | 1.18 | 5.8 | 350 | 1.66 | 45 |
| HFE-7500 | −100 | 128 | 1.26 | N/A | 414 | 1.61 | 6 |
| HFE-7600 | −98 | 131 | 1.07 | N/A | 348 | 1.54 | 7 |

1,1,1,2,2,3,4,5,5,5-decafluoro-3-methoxy-4-(trifluoromethyl)-pentane (HFE-7300), 3-ethoxy-1,1,1,2,3,4,4,5,5,6,6,6-dodecafluoro-2-trifluoromethyl-hexane (HFE-7500), and 1,1,1,2,3-hexafluoro-4-(1,1,2,3,3,3-hexafluoropropoxy)-pentane (HFE-7600) maybe particular suitable for pouch cells because of their low vapor pressure. Furthermore, these fluorinated ethers have relatively high boiling points, which is beneficial for pouch cell applications. Ethers with lower molecular weight may be more suitable for hard cell applications because of their low viscosity resulting in better ionic mobility. In some embodiments, 1,1,1,2,3-hexafluoro-4-(1,1,2,3,3,3-hexafluoropropoxy)-pentane (HFE-7600) is used because of its superior solubility of different electrolyte salts.

Some usable fluorinated solvents may be expressed by the following formulas: $C_6F_{13}OCH_3$, $C_6F_{13}OC_2H_5$, $CH_3OC_6F_{12}OCH_3$, $CH_3OC_3F_6OC_3F_6OCH_3$, $CF_3CFHCF_2OCH_2CH(CH_3)OCF_2CFHCF_3$, $H(CF_2)_8CH_2OCH_3$, $CF_3CFHCF_2OCH_2CH(OCF_2CFHCF_3)CH_2OCF_2CFHCF3$, $C(CH_2OCF_2CFHCF_3)4$, $CH_3C(CH_2OCF_2CFHCF_3)_3$, $C_4F9OCH_2CH_2OC_4F_9$, and mixtures thereof.

Other examples of fluorinated solvents include perfluoropolyethers, such as Galden HT135 (having a chemical formula $CF_3$—$(OC_3F_6)_n$—$(OCF_2)_n$—$OCF_3$ and available from SOLVAY SOLEXIS SpA in Milan, Italy), Galden HT200 (having a chemical formula $CF_3$—$(OC_3F_6)_n$—$(OCF_2)_m$—$OCF_3$ and available from SOLVAY SOLEXIS SpA), and Galden HT170 (having a chemical formula $CF_3$—$(OC_3F_6)_n$—$(OCF_2)_m$—$OCF_3$ and available from SOLVAY SOLEXIS SpA) differing in polymer lengths.

As noted above, the fluorinated solvents reduce flammability of electrolytes even when non-fluorinated solvents are present in the same solutions. Certain fluorinated solvents and electrolytes formed by these solvents are classified in the US as non-flammable liquids according to criteria set in Hazardous Materials Identification System (HMIS) standard. For purposes of this document, a solvent or an electrolyte mixture is considered to be non-flammable when it has a closed cup flash point of more than 140° F. (37.8° C.) (e.g., according to at least one of ASTM No. D3278-96 (2004) "Standard Test Methods for Flash Point of Liquids by Small Scale Closed-Cup Apparatus" or D7236-06 (2006) "Standard Test Method for Flash Point by Small Scale Closed Cup Tester (Ramp Method)." Specifically, HFE-7000, HFE-7100, HFE-7200, HFE-7300, HFE-7500, and HFE-7600 available from 3M Specialty Materials in St. Paul, Minn. are nonflammable liquids and have no flash point. For comparison, many conventional electrolyte solvents have relatively low flashpoints (e.g., dimethyl carbonate has a flashpoint of 14° C. while ethyl methyl carbonate has a flashpoint of 23° C., and diethyl carbonate has a flashpoint of 25° C.) resulting in high flammability of these solvents and electrolytes formed by these solvents. Addition of HFE-7000, HFE-7100, HFE-7200, HFE-7300, HFE-7500, or HFE-7600 to dimethyl carbonate, ethyl methyl carbonate, and/or diethyl carbonate results in mixtures having substantially lower flammability than carbonates not combined with one of these fluorinated solvents.

A sufficient amount of one or more fluorinated solvents may be provided in an electrolyte to reduce its flammability. In some embodiments, a combined concentration of all fluorinated solvents present in an electrolyte is between about 30% and 80% by weight or, more specifically, between about 40% and 75% by weight or even between about 45% and 72.5% by weight excluding the weight of the electrolyte. The remaining components (other than the electrolyte salts) may include non-fluorinated solvents, flame retardant additives, and/or ionic liquids. In some embodiments, the electrolyte is substantially free of any components other than one or more electrolyte salts and one or more fluorinated solvents. As such, the concentration of the fluorinated solvents in the electrolyte may be about 100% by weight (excluding the weight of the electrolyte salts).

Low viscosity fluorinated solvents may be used to ensure adequate ionic mobility. In some embodiments, the viscosity of the fluorinated solvent may be less than about 5.0 cP or, more specifically, less than about 2.0 cP, and even less than about 1.0 cP. For example, 1-methoxyheptafluoropropane has a viscosity of about 0.45 cP, methyl nonafluorobutyl ether has a viscosity of about 0.58 cP, ethyl nonafluorobutyl ether has a viscosity of about 0.58 cP, and 3-ethoxy-1,1,1,2,3,4,4,5,5,6,6,6-dodecafluoro-2-trifluoromethyl-hexane has a viscosity of about 1.240 cP.

Fluorinated solvents with high boiling points and low vapor pressures may be used, in particular, for soft case electrochemical devices, such as pouch cells. In some embodiments, one or more fluorinated cells provided in an electrolyte has a boiling point at least about 70° C. or, more specifically, at least about 90° C. or even at least about 120° C. For example, 3-ethoxy-1,1,1,2,3,4,4,5,5,6,6,6-dodecafluoro-2-trifluoromethyl-hexane has boiling point of 130° C. Fluorinated solvents with lower boiling points may be used as well, in particular for hard case cells, such as cylindrical and prismatic wound cells. For example, 1-methoxyheptafluoropropane has a boiling point of about 34° C., methyl nonafluorobutyl ether has a boiling point of about 61° C., while ethyl nonafluorobutyl ether has a boiling point of about 76° C.

Solvent with vapor pressure less than 100 kPa or, more specifically, with less than 50 kPa or even less than 25 kPa may be used. For example, 1-methoxyheptafluoro propane has a vapor pressure of 65 kPa, methyl nonafluorobutyl ether has a vapor pressure of 27 kPa, ethyl nonafluorobutyl ether has a vapor pressure of 16 kPa, and 3-ethoxy-1,1,1,2,3,4,4,5,5,6,6,6-dodecafluoro-2-trifluoromethyl-hexane has a vapor pressure of 2.1 kPa.

Furthermore, some fluorinated ethers, such as HFE-7300, have low melting points and may be particularly suitable for electrolyte mixtures to be used in cells operating at lower temperatures.

Examples of Non-Fluorinated Solvents

In some embodiments, one or more fluorinated solvents may be combined with one or more non-fluorinated solvents in the same electrolyte solution. The non-fluorinated solvents may be used to ensure solubility, maintain viscosity, and other characteristics of the overall solutions. Without being restricted to any particular theory, it is believed that non-fluorinated solvents are primarily responsible for forming an SEI layer. However, fluorinated solvents may help to improve elasticity and other characteristics of the SEI layer as described above.

Various non-fluorinated solvents may be used, such as non-fluorinated esters, ethers, and carbonates. In some embodiments, non-fluorinated solvents include linear and cyclic esters, ethers, and carbonates. Specifically, liner carbonates or linear esters may be used. These solvents enhance electrolyte transport properties by increasing the conductivity and reducing the viscosity. Some specific examples include dimethyl carbonate (DMC), ethyl methyl carbonate (EMC), diethyl carbonate (DEC), propylene carbonate (PC), ethylene carbonate (EC), methyl acetate (MA), ethyl acetate (EA), methyl propionate (MP), ethyl propionate (EP), methyl butyrate (MB), and ethyl butyrate (EB). Conductivity trends for some of these examples are presented by the following example: MA>EA>MP>EP>MB>EB and, separately, DMC>EMC>DEC. Overall, smaller molecular weight solvents tend to improve conductivity.

Some physical properties of a few non-fluorinated solvents are presented in the following table:

TABLE

Physical Properties of Selected Non-Fluorinated Solvents

| Solvent | m.p. (° C.) | b.p. (° C.) | Viscosity (cp) | dielectric constant | MW | density (g/ml) | Vapor Pressure mm Hg @ 20° C. |
|---|---|---|---|---|---|---|---|
| DMC | 4.6 | 91 | 0.59 | 3.1 | 90 | 1.06 | 42 |
| EMC | −53 | 110 | 0.65 | 3.0 | 104 | 1.01 | 27 |
| DEC | −74 | 126 | 0.75 | 2.8 | 118 | 0.97 | 7.5 |
| PC | −49 | 242 | 2.53 | 64.9 | 102 | 1.20 | 0.03 |
| EC | 36.4 | 248 | 1.9 | 89.8 | 88 | 1.32 | 0.02 |
| MA | −98 | 57.5 | 0.368 | 6.7 | 74 | 0.93 | 170 |
| EA | −84 | 77 | 0.45 | 6.0 | 88 | 0.90 | 76 |
| MP | −88 | 79 | 0.43 | 6.2 | 88 | 0.92 | 29 |
| EP | −74 | 99 | 0.51 | 5.7 | 102 | 0.89 | 27 |
| MB | −84 | 103 | 0.64 | 5.5 | 102 | 0.90 | 31 |
| EB | −93 | 120 | 0.71 | 5.4 | 116 | 0.88 | 15.5 |

Selection of these non-fluorinated solvents depends in part on types of electrodes and operating conditions of the cell. For example, rechargeable lithium ion cells with carbon-based negative electrode may be filled with electrode including ethylene carbonate because of ethylene carbonate's ability to form a desirable SEI layer on the negative electrode. Alternatively, when electrochemical cells include lithium metal based negative electrodes or lithium titanate based negative electrode, the electrolyte may include may include propylene carbonate. In some embodiments, cyclic carbonates ate not used with lithium metal and lithium titanate electrodes. Overall, formulating appropriate electrolytes for particular electrode materials and electrode porosity, cell design and application, may involve balancing the safety characteristics with other characteristics of the electrolytes. Specifically, lower molecular weight esters enhance the ionic conductivity more than the higher molecular weight esters. However, the lower molecular weight esters are more volatile and reactive than the higher molecular weight esters.

The concentration of the non-fluorinated solvents may be less than 50% by weight excluding the weight of the electrolyte or, more specifically, less than 30% by weight and even less than 20% by weight. In general, the amount of the non-fluorinated solvents in the electrolyte solution should be minimized in order to reduce flammability of the solution. Similar to the fluorinated solvents, low viscosity non-fluorinated solvents may be used to ensure adequate ionic mobility. In some embodiments, the viscosity of the non-fluorinated solvent may be less than about 5.0 cP or, more specifically, less than about 2.0 cP, and even less than about 1.0 cP. In some embodiments, the viscosity may be in the range of about 0.3 cP to about 2.0 cP.

Non-fluorinated solvents with high boiling points and low vapor pressures may be used, in particular, for soft case electrochemical devices, such as pouch cells. In some embodiments, one or more non-fluorinated cells provided in an electrolyte has a boiling point at least about 50° C. or, more specifically, at least about 90° C. and even at least about 120° C. The boiling point ranging from about 50° C. to about 250° C.

Examples of Flame-Retardant Additives

In some embodiments, an electrolyte includes a flame-retardant additive, which may be also referred to as a flame retardant. The flame retardants may be phosphorous compounds, such as phosphazenes (e.g., cyclic phosphazenes), phosphines, phosphates, and phosphites. One specific example is dimethyl methylphosphonate (DMMP), which tends to favorably increase the conductivity of the electrolyte with the increase in the concentration of DMMP. Some examples of the flame retardants may be expressed using the following formulas: $N_4P_4F_8$, $N_3P_3(NH_2)_6$, $N_3P_3(OC_3H_7)_6$; $N_3P_3(OC_6H_5)_6$; $N_3P_3(OC_6H_5)_3(OC_6H_4OH)_3$, 2,2-$N_3P_3$ $(OC_6H_4)(NH_2)_2$, $N_3P_3(OCH_2C_2F_5)_3(OCH_2C_4F_8H)_3$; $N_3P_3$ $(OCH_2C_4F_8H)_6$; $N_3P_3(NHC_6H_5)_6$, $P_XN_X(OC_3H_7)_{2X}$, where X=3, 6 or 9, and $P_3N_3F_X(OR)_{6-X}$, where each R is an independent alkyl with number of carbon atoms from 1 to 12 or an aromatic hydrocarbon, and where X is from 1 to 6.

Flame-retardant additives improve electrolyte safety when added in sufficient amounts. The concentration of the flame-retardant additive in the electrolyte may be between about 1% and 15% by weight excluding the electrolyte salt or, more specifically, between about 2.5% and 12.5% by weight or even between about 5% and 10% by weight. Higher concentrations of the flame-retardant additive may negatively impact on the cell performance (e.g., cycle life), while lower concentrations may be ineffective. In some embodiments, the flame-retardant additive has a boiling point of less than 120° C. and even less than 90° C.

Examples of Ionic Liquids

In some embodiments, an electrolyte includes one or more ionic liquids. Addition of ionic liquids increases the electrolyte safety by reducing its vapor pressure. The ionic liquids should be electrochemically stable within the operating potential range of the electrodes. For lithium and lithium ion cells, the ionic liquid may be stable stable up to at least 4V versus Li reference electrode and even up to 5V. Some examples of suitable ionic liquids include pyridinium ionic liquids, peperridinium ionic liquids, imidazolium ionic liquids, and phosphonium ionic liquids. The ionic liquids can utilize any of the anions of the lithium salts listed above with some ionic liquids having an anion with molecular weight above about 250 g/mol. The concentration of the one or more ionic liquids in the electrolyte may be between 1% and 25% by weight not accounting for the electrolyte salts or, more specifically, between 2.5% and 22.5% or even between 5% and 20%.

Examples of Electrolyte Characteristics

Electrochemical cell applications, such as vehicle applications, aerospace applications, grid applications, and many other applications, may subject the cells to a wide range of temperatures. The electrolyte and its components should remain stable. Specifically, the electrolyte should stay as a one phase solution at all operating temperatures. In other words, the electrolyte should not separate into its components to ensure proper cell operation. In some embodiments, the electrolyte remains a one-phase solution at temperatures between about −30° C. and 80° C. or, more specifically, between about −20° C. and 70° C. In some embodiments, the electrolyte remains as a one-phase solution at temperatures between about −25° C. and 85° C. or between about −20° C. and 90° C.

The electrolyte should be sufficiently conductive. In some embodiments, the conductivity of the electrolyte ranges between about 0.1 mS and 10 mS or, more specifically, between about 0.5 mS and 10 mS and even between about 1.0 mS and 10 mS. Less conductive electrolyte may not be suitable for some battery applications, in particular high rate applications.

A cell including a non-flammable electrolyte may have a stable cycle life. In some embodiment, the capacity of an electrochemical cell that includes a fluorinated solvent decreases by less than about 20% or even by less than about 10% after 500 cycles at 20° C. The cells may be cycled at 0.5 C charge and 0.5 C discharge rates with cutoff voltages of 4.2V-3.0V.

As noted above, the electrolyte may be non-flammable or, more specifically, is not excessively flammable like, for example, carbonate based solvents. Addition of non-flammable and extinguishing components into electrolytes should be sufficient and should compensate for presence of any flammable components, such as non-fluorinated solvents. The flammability of the electrolyte may be measured using a typical flammability test. This test involves dispensing between about 0.5 g and 3 g of the on a precut piece of a fiber glass separator. The electrolyte is then ignited with a propane torch and the amount of time it takes for electrolyte to burn or self-extinguish is recorded. The self-extinguishing time (SET) is then calculated in seconds per gram of the electrolyte. In some embodiments, the electrolyte tested in accordance with the above test protocol has the SET of less than about 30 sec/gram or, more specifically, less than about 25 sec/gram or even less than about 20 sec/gram, less than about 15 sec/gram, or less than about 10 sec/gram. Additional safety tests may be performed on the complete cells and not just electrolyte.

Examples of Electrochemical Cells

Various electrolyte compositions described herein may be used in standard cells, e.g., 10180, 10280, 10440 (same as AAA cells), 14250, 14500 (same as AA cells), 14650, 15270, 16340, 17340 (same as R123), 17500, 17670, 18350, 18500, 18650, 19670, 25500 (same as C cells), 26650, and 32600 (same D cells), or custom cells. The cells may be cylindrical, prismatic, pouch, or any other type.

A brief description of a cell is provided for better understanding of some electrolyte features as well as components that come in contact with electrolyte and expose electrolyte to certain potentials. FIG. 1 illustrates a schematic cross-sectional view of a cylindrical wound cell 100, in accordance with some embodiments. Positive electrode 106, negative electrode 104, and separator strips 108 may be wound into a jelly roll, which is inserted into a cylindrical case 102. The jelly roll is a spirally wound assembly of positive electrode 106, negative electrode 104, and two strips of separator 108. The jelly roll is formed into a shape of case 102 and may be cylindrical for cylindrical cells and flattened oval for prismatic cells. Other types of electrode arrangements include stacked electrodes that may be inserted into a hard case or a flexible case.

The electrolyte (not shown) is supplied into case 102 prior to sealing cell 100. The electrolyte soaks into positive electrode 106, negative electrode 104, and separator 108, all of which are porous components. The electrolyte provides ionic conductivity between positive electrode 106 and negative electrode 104. As such, the electrolyte is exposed to operating potentials of both electrodes and comes in contact with essentially all internal components of cell 100. The electrolyte should be stable at these operating potentials and should not damage the internal components.

Case 102 may be rigid, in particular for lithium ion cells. Other types of cells may be packed into a flexible, foil-type (polymer laminate) case. For example, pouch cells are typically packed into a flexible case. A variety of materials can be chosen for case 102. Selection of these materials depends in part on an electrochemical potential to which case 102 is exposed to. More specifically, the selection depends on which electrode, if any, case 102 is connected to and what are operating potentials of this electrode.

If case 102 is connected to positive electrode 106 of a lithium ion battery, then case 102 may be formed from titanium 6-4, other titanium alloys, aluminum, aluminum alloys, and 300-series stainless steel. On the other hand, if case 102 is connected to negative electrode 104 of the lithium ion battery, then case 102 may be made from titanium, titanium alloys, copper, nickel, lead, and stainless steels. In some embodiments, case 102 is neutral and may be connected to an auxiliary electrode made, for example, from metallic lithium. An electrical connection between case 102 and an electrode may be established by a direct contact between case 102 and this electrode (e.g., an outer wound of the jelly roll), by a tab connected to the electrode and case 102, and other techniques. Case 102 may have an integrated bottom as shown in FIG. 1. Alternatively, a bottom may be attached to the case by welding, soldering, crimping, and other techniques. The bottom and the case may have the same or different polarities (e.g., when the case is neutral).

The top of case 102, which is used for insertion of the jelly roll, may be capped with a header assembly that includes a weld plate 112, a rupture membrane 114, a PCT washer 116, header cup 118, and insulating gasket 119. Weld plate 112, rupture membrane 114, PCT washer 116, and header cup 118 are all made from conductive material and are used for conducting electricity between an electrode (negative electrode 104 in FIG. 1) and cell connector 620 (integrated or attached to header cup 118 in FIG. 1). Insulating gasket 119 is used to support the conductive components of header assembly 110 and insulate these components from case 102. Weld plate 112 may be connected to the electrode by tab 109. One end of tab 109 may be welded to the electrode (e.g., ultrasonic or resistance welded), while the other end of tab may be welded to weld plate 112. Centers of weld plate 112 and rupture membrane 114 are connected due to the convex shape of rupture membrane 114. If the internal pressure of cell 110 increases (e.g., due to electrolyte decomposition and other outgassing processes), rupture membrane 114 may change its shape and disconnect from weld plate thereby breaking the electrical connection between the electrode and cell connector 620.

PCT washer 116 is disposed between edges of rupture membrane 114 and edges of header cup 118 effectively interconnecting these two components. At normal operating temperatures, the resistance of PCT washer 116 is low. However, its resistance increases substantially when PCT washer 116 is heated up due to, e.g., heat released within cell 100. PCT washer 116 is effectively thermal circuit breaker that can electrically disconnect rupture membrane 114 from header cup 118 and, as a result, disconnect the electrode from cell connector 620 when the temperature of PCT washer 116 exceeds a certain threshold temperature. In some embodiments, a cell or a battery pack may use a negative thermal coefficient (NTC) safety device in addition to or instead of a PCT device.

Types of electrochemical cells are determined by active materials used for positive and negative electrodes. Some examples of positive active materials include Li (M'XM"Y)$O_2$, where M' and M" are different metals (e.g., Li(NiXMnY)$O_2$, Li(Ni$_{1/2}$Mn$_{1/2}$)$O_2$, Li(Cr$_X$Mn$_{1-X}$)$O_2$, Li(Al$_X$Mn$_{1-X}$)$O_2$), Li(Co$_X$M$_{1-X}$)$O_2$, where M is a metal, (e.g., Li(Co$_X$Ni$_{1-X}$)$O_2$ and Li(Co$_X$Fe$_{1-X}$)$O_2$), Li$_{1-W}$(Mn$_X$Ni$_Y$Co$_Z$)$O_2$, (e.g., Li(Co$_X$Mn$_Y$Ni$_{(1-X-Y)}$)$O_2$, Li(Mn$_{1/3}$Ni$_{1/3}$Co$_{1/3}$)$O2$, Li(Mn$_{1/3}$Ni$_{1/3}$Co$_{1/3-X}$Mg$_X$)$O_2$, Li(Mn$_{0.4}$Ni$_{0.4}$Co$_{0.2}$)$O_2$, Li(Mn$_{0.1}$Ni$_{0.1}$Co$_{0.8}$)$O_2$,) Li$_{1-W}$(Mn$_X$Ni$_X$Co$_{1-2X}$)$O_2$, Li$_{1-W}$(Mn$_X$Ni$_Y$CoAl$_W$)$O_2$, Li$_{1-W}$(Ni$_X$Co$_Y$Al$_Z$)$O_2$, (e.g., Li(Ni$_{0.8}$Co$_{0.15}$Al$_{0.05}$)$O_2$), Li$_{1-W}$(Ni$_X$Co$_Y$M$_Z$)$O_2$, where M is a metal, Li$_{1-W}$(Ni$_X$Mn$_Y$M$_Z$)$O_2$, where M is a metal, Li(Ni$_{X-Y}$Mn$_Y$Cr$_{2-X}$)$O_4$, LiM'M"$_2$O$_4$, where M' and M" are different metals (e.g., LiMn$_{2-Y-Z}$Ni$_Y$O$_4$, LiMn$_{2-Y-Z}$Ni$_Y$Li$_Z$O$_4$, LiMn$_{1.5}$Ni$_{0.5}$O$_4$, LiNiCuO$_4$, LiMn$_{1-X}$Al$_X$O$_4$, LiNi$_{0.5}$Ti$_{0.5}$O$_4$, Li$_{1.05}$Al$_{0.1}$Mn$_{1.85}$O$_{4-Z}$F$_Z$, Li$_2$MnO$_3$), Li$_X$V$_Y$O$_Z$, e.g., LiV$_3$O$_8$, LiV$_2$O$_5$, and LiV$_6$O$_{13}$, LiMPO$_4$, where M is a metal; lithium iron phosphate (LiFePO$_4$) is a common example. It is both inexpensive and has high stability and safety, because the relatively strong phosphate bonds tend to keep the oxygen in the lattice during overcharge, but has poor conductance and require substantial amounts of conductive additives, LiM$_X$M"$_{1-X}$PO$_4$ where M' and M" are different metals (e.g. LiFePO$_4$), LiFe$_X$M$_{1-X}$PO$_4$, where M is a metal, LiVOPO$_4$, Li$_3$V$_2$(PO$_4$)$_3$, LiMPO$_4$, where M is a metal such as iron or vanadium. Further, a positive electrode may include a secondary active material to improve charge and discharge capacity, such as V$_6$O$_{13}$, V$_2$O$_5$, V$_3$O$_8$, MoO$_3$, TiS$_2$, WO$_2$, MoO$_2$, and RuO$_2$.

The selection of positive electrode materials depends on several considerations, such as cell capacity, safety requirements, intended cycle life, etc. Lithium cobalt oxide (LiCoO$_2$) may be used in smaller cells that require higher gravimetric and/or volumetric capacities, such as portable electronics and medical devices. Cobalt may be partially substituted with Sn, Mg, Fe, Ti, Al, Zr, Cr, V, Ga, Zn, or Cu. Certain materials, such as lithium nickel oxide (LiNiO$_2$), may be less prone to thermal runaway. Other materials provide substantial cost advantage, such as lithium manganese oxide (LiMnO$_2$). Furthermore, lithium manganese oxide has a relatively high power density because its three-dimensional crystalline structure provides more surface area, thereby permitting more ion flux between the electrodes.

Active materials may be deposited as layers on conductive substrates for delivering electrical current between the active materials and cell terminals. Substrate materials may include copper and/or copper dendride coated metal oxides, stainless steel, titanium, aluminum, nickel (also used as a diffusion barrier), chromium, tungsten, metal nitrides, metal carbides, carbon, carbon fiber, graphite, graphene, carbon mesh, conductive polymers, or combinations of above including multi-layer structures. The substrate material may be formed as a foil, films, mesh, laminate, wires, tubes, particles, multi-layer structure, or any other suitable configurations. In one example, a substrate is a stainless steel foil having thickness of between about 1 micrometer and 50 micrometers. In other embodiments, a substrate is a copper foil with thickness of between about 5 micrometers and 30 micrometers. In yet another embodiments, a substrate is an aluminum foil with thickness of between about 5 micrometers and 50 micrometers.

In some embodiments, a separator material may include a fabric woven from fluoro-polymeric fibers of polyethylenetetrafluoroethylene (PETFE) and polyethylenechlorotrifluoroethylene used either by itself or laminated with a fluoropolymeric microporous film. Moreover, a separator materials may include, polystyrenes, polyvinyl chlorides polypropylene, polyethylene (including LDPE, LLDPE, HDPE, and ultra high molecular weight polyethylene), polyamides, polyimides, polyacrylics, polyacetals, polycarbonates, polyesters, polyetherimides, polyimides, polyketones, polyphenylene ethers, polyphenylene sulfides, polymethylpentene, polysulfones non-woven glass, glass fiber materials, ceramics, a polypropylene membrane commercially available under the designation CELGARD from Celanese Plastic Company, Inc. in Charlotte, N.C., USA, as well as Asahi Chemical Industry Co. in Tokyo, Japan, Tonen Corporation, in Tokyo, Japan, Ube Industries in Tokyo, Japan, and Nitto Denko K.K. in Osaka, Japan. In one embodiment, a separator includes copolymers of any of the foregoing, and mixtures thereof.

A typical separator has the following characteristic: air resistance (Gurley number) of less than about 800 seconds, or less than about 500 seconds in a more specific embodiment; thickness of between about 5 µm and 500 µm, or in specific embodiment between about 10 µm and 100 µm, or more specifically between about 10 µm and 30 µm; pore diameters ranging from between about 0.01 µm and 5 µm or more specifically between about 0.02 µm and 0.5 µm; porosity ranging from between about 20% and 85%, or more specifically, between about 30% and 60%.

In some embodiments, the negative electrode includes graphite, hard carbon, titanate ($Li_4Ti_5O_{12}$), silicon, and/or germanium. The positive electrode may be formed from $LiCoO_2$, $LiMn_2O_4$, $LiNiO_2$, $LiFePO_4$, $Li_2FePO_4F$, and/or $LiCo_{1/3}Ni_{1/3}Mn_{1/3}O_2$ (or. More generally, $Li(Li_zNi_xMn_yCo_z)O_2$. The separator may be made from polyethylene, polypropylene, mixtures of polyethylene and polypropylene, micro-porous poly(methyl methacrylate)-grafted polyethylene, and/or siloxane grafted polyethylene.

In some embodiments, the capacity of an electrochemical cell including one of the electrolyte examples described above is between about 1 Wh and 10,000 Wh or, more specifically, between 5 Wh and 100 Wh.

Experimental Data

Various experiments were conducted to determine effects of ionic liquids, non-fluorinated solvents, and phosphazene additives on electrolyte flammability. Different electrolyte formulations were prepared for this particular group of tests. All formulations included 0.8 M LiBETI, 50% by weight (not accounting for the weight of the electrolyte salts) of 1,1,1,2,2,3,4,5,5,5-decafluoro-3-methoxy-4-(trifluoromethyl)-pentane (HFE 7300) unless specifically noted. The remaining 50% by weight included other components, such as ionic liquids, non-fluorinated solvents, and phosphazene additives. The self-extinguishing test (SET) described above was used for determining electrolyte flammability.

The effect of ionic liquids was tested using a first formulation that included 5% by weight of ethylene carbonate, 35% by weight of methyl propionate, and 10% by weight of phosphazene (added to the 50% by weight of 1,1,1,2,2,3,4,5,5,5-decafluoro-3-methoxy-4-(trifluoromethyl)-pentane (HFE 7300)) and a second formulation that included 5% by weight of ethylene carbonate, 30% by weight of methyl propionate, 5% by weight of N-butyl-N-methylpyrrolidinum bis(perfluoroethanesulfonyl) imide (i.e., $P_{14}$Beti), and 10% by weight of phosphazene. The SET values for the formulation without $P_{14}$BETI was 10.9 sec/g and for the one with $P_{14}$BETI was 4.3 sec/g. As such, addition of $P_{14}$BETI substantially reduces flammability of the electrolyte.

A similar set of experiments was conducted to determine effects of different non-fluorinated solvents on flammability of the electrolyte. All formulations included 5% by weight of ethylene carbonate, 5% by weight of $P_{14}$BETI, and 10% by weight of phosphazene (in addition to LiBETI and 1,1,1,2,2, 3,4,5,5,5-decafluoro-3-methoxy-4-(trifluoromethyl)-pentane). The remaining 30% include one of the following non-fluorinated solvents: ethyl propionate, methyl butyrate, ethyl butyrate, and diethyl carbonate. SET values for these electrolytes were as follows: for a formulation with ethyl propionate—11 sec/gram, for a formulation with methyl butyrate—24 sec/gram, for a formulation with ethyl butyrate—26 sec/gram, and for a formulation with diethyl carbonate—15 sec/gram. For conventional carbonate-only electrolytes, the flammability level is at 40-50 sec/g. As such, presence of the fluorinated solvent (1,1,1,2,2,3,4,5,5,5-decafluoro-3-methoxy-4-(trifluoromethyl)-pentane) as well as flame retardants (P14BETI and phosphazene) helped to significantly reduce flammability of the solution.

Yet another set of experiments was conducted to determined effects of phosphazene additives on the flammability of electrolytes. In addition to LiBETI and 1,1,1,2,2,3,4,5,5,5-decafluoro-3-methoxy-4-(trifluoromethyl)-pentane, all formulations used in this set included 45% by weight of methyl propionate and 5% by weight of ethyl carbonate. Two different cyclic phosphazenes were used at two different concentrations. The base electrolyte (i.e., the one without any phosphazene) has yielded the SET value of 24.5 sec/gram. Adding 5% by weight of the two cyclic phosphazenes (based on the weight of the solution including 50% by weight of 1,1,1,2,2,3,4,5,5,5-decafluoro-3-methoxy-4-(trifluoromethyl)-pentane, 45% by weight of methyl propionate and 5% by weight of ethyl carbonate) resulted in the SET values of 24.5 sec/gram and 19.9 sec/gram, while adding 10% by weight of the same two cyclic phosphazenes reduced the SET values to 10.9 sec/gram and 16.8 sec/gram respectively. As such, the cyclic phosphazenes become effective at concentrations closer to 10% by weight (excluding the weight of the salt).

Another series of tests was performed to study effects of non-fluorinated solvents on electrolyte miscibility or, more specifically, on phase separation. Different non-fluorinated solvents were added to a solution including LiBETI, 1,1,1,2, 2,3,4,5,5,5-decafluoro-3-methoxy-4-(trifluoromethyl)-pentane), 5% by weight of ethylene carbonate, 5% by weight of P14BETI, 10% by weight of a cyclic phosphazene, and 30% of one of the tested non-fluorinated solvents. The solutions were checked for phase separation at −18° C. and at −30° C. For the solution with ethyl propionate, no phase separation was observed at both −18° C. and −30° C. The same results were achieved for the solutions with methyl butyrate, ethyl butyrate, and diethyl carbonate. However, when ethyl methyl carbonate was added, the electrolyte showed phase separation at both −18° C. and −30° C.

Electrolyte conductivity was evaluated using different non-fluorinated solvents and flame-retardant additives. The non-fluorinated solvents selected for this conductivity test were the same as in the phase separation test described, i.e., ethyl propionate, methyl butyrate, ethyl butyrate, and diethyl carbonate. These non-fluorinated solvents were added at 30% by weight to the base solution included 50% by weight of 1,1,1,2,2,3,4,5,5,5-decafluoro-3-methoxy-4-(trifluoromethyl)-pentane, 5% by weight of ethylene carbonate, 5% by weight of P14BETI, 10% by weight of a cyclic phosphazene. These weight ratios exclude the weight of the electrolyte salt, which was 0.8 M of LiBETI in this test. The electrolyte solution containing ethyl propionate had a conductivity of 2.2 mS/cm, while the solution with methyl butyrate has conductivity of 2.0 mS/cm. The solutions with ethyl butyrate and diethyl carbonate demonstrated somewhat lower conductivities, i.e., 1.66 mS/cm and 1.07 mS/cm respectively.

The base solution for testing conductivity with flame-retardant additives included 1.0 M LiBETI, 71% by weight of methoxy-nonafluorobutan, 4% by weight of ethylene carbonate, 5% by weight of $P_{14}$TFSI, 18% by weight of methyl acetate, and 2% by weight of vinyl carbonate. The conductivity of the base electrolyte (i.e., no without any flame-retardant additives) was 3.77 mS/cm. DMMP was added to the base electrolyte in different amounts. LiBETI was included in the estimates of the DMMP concentrations. The base electrolyte can be considered 1M LiBETI and solvent as described above. For example, DMMP is added in 5 wt % means that the electrolyte formulation is created by taking 95% of the base electrolyte plus 5% DMMP. The electrolyte with 5% by weight of DMMP showed conductivity of 4.26 mS/cm, with 10% by weight of DMMP—5.43 mS/cm and with 15% by weight of DMMP—5.35 mS/cm.

Cycle life testing was performed using both cylindrical cells and pouch cells. 18650-type cells were constructed for cylindrical cell testing. The initial capacity of these cells was about 2.2 Ah. The cells were constructed using lithium nickel cobalt manganese oxide (NCM) as a positive electrode material and graphite as a negative electrode material. The cells were filled with an electrolyte having the following composition: 0.8 M LiBETI, 50% by weight of methoxy-nonafluorobutan, 45% by weight of methyl propionate, and 5% by weight of ethylene carbonate. 2% by weight of vinyl carbonate and 10% by weight of a cyclic phosphazene were added to this mixture. In this example, the base electrolyte included 0.8M LiBeti 50% HFE, 5% EC, and 45% MP. 2% VC and 10% phosphazene were added to the 88% of the base electrolyte. The cells were tested at different temperatures and cut of voltages. These cells were cycled at 0.5 C charge and 0.5 C discharge rates from 4.2V-3.0V. The results of cycling tests are presented in the following table.

TABLE

Capacity Drop Values for Cylindrical Cells

| | Cut Off Voltage | |
|---|---|---|
| Temperature | 4.0 V | 4.2 V |
| 20° C. | <10% after 350 cycles | ~15% after 300 cycles |
| 40° C. | ~10% after 375 cycles | <10% after 250 cycles |
| 60° C. | ~20% after 375 cycles | <20% after 300 cycles |

Pouch cells were constructed using the same electrode materials and electrolyte. The results of the cycling test are presented in the table below.

TABLE

Capacity Drop Values for Cylindrical Cells

| | Cut Off Voltage | |
|---|---|---|
| Temperature | 4.0 V | 4.2 V |
| 20° C. | <10% after 275 cycles | — |
| 40° C. | <10% after 190 cycles | <20% after 175 cycles |

For comparison, data for cylindrical NCM cells filled with 1M LiPF6 EC:DMC:EMC at 1:2:2 ratio with 2% VC added is presented below

| | Cut Off Voltage 4.2 V |
|---|---|
| Temperature | |
| 20° C. | ~10% after 300 cycles |
| 40° C. | ~10% after 250 cycles |
| 60° C. | ~10% after 300 cycles |

A series of safety tests was performed on pouch cells fabricated with lithium cobalt oxide (LCO) as a positive electrode material. Four of electrolytes were used. The first electrolyte included 0.8M LiBeti, 55% by weight of 1,1,1,2,2,3,4,5,5,5-decafluoro-3-methoxy-4-(trifluoromethyl)-pentane, 5% by weight of ethylene carbonate, 30% by weight of methyl propionate, and 10% by weight of a cyclic phosphazene. 2% by weight of vinyl carbonate was added to this mixture. 2% by weight of VC was added to 98% by weight of the base electrolyte with the base electrolyte being 55% HFE, 5% EC, 30% MP, and 10% Phosphazene. The second electrolyte included 1.0M of $LiPF_6$ combined with a 1:2 weight ratio of ethylene carbonate and diethyl carbonate. 2% by weight of vinyl carbonate and 10% by weight of cyclic phosphazene were added to this mixture. The third electrolyte included 0.8M LiBeti, 50% by weight of 3-ethoxy-1,1,1,2,3,4,4,5,5,6,6,6-dodecafluoro-2-trifluoromethyl-hexane, 5% by weight of ethylene carbonate, 35% by weight of ethyl butyrate, and 10% by weight of a cyclic phosphazene. 2% by weight of vinyl carbonate was also added to this mixture. The fourth electrolyte included 0.8M LiBeti, 65% by weight of 1,1,1,2,2,3,4,5,5,5-decafluoro-3-methoxy-4-(trifluoromethyl)-pentane, 5% by weight of ethylene carbonate, 5% by weight of ethyl methyl carbonate, 17.5% by weight of ethyl propionate, and 7.5% by weight of a cyclic phosphazene. 2% by weight of vinyl carbonate was also added to this mixture.

The safety tests included a heating test, an overcharge test, and a nail penetration test. The results of these tests are presented in the following table.

TABLE

Safety Test Results of Cells Built with LCO electrodes

| Test | First Electrolyte | Second Electrolyte | Third Electrolyte | Fourth Electrolyte |
|---|---|---|---|---|
| Heating | Max Temp = 158° C.; Flames | — | Max Temp = 160° C.; Flames | Max Temp = 154° C.; Flames |
| Overcharge | Swelling and Explosion | Swelling and Explosion | Swelling and Explosion | Swelling, Rupture, Flames and Explosion |
| Nail | Vented sparks and smoke | — | Vented sparks and smoke | Vented and flames |

Figure 2:
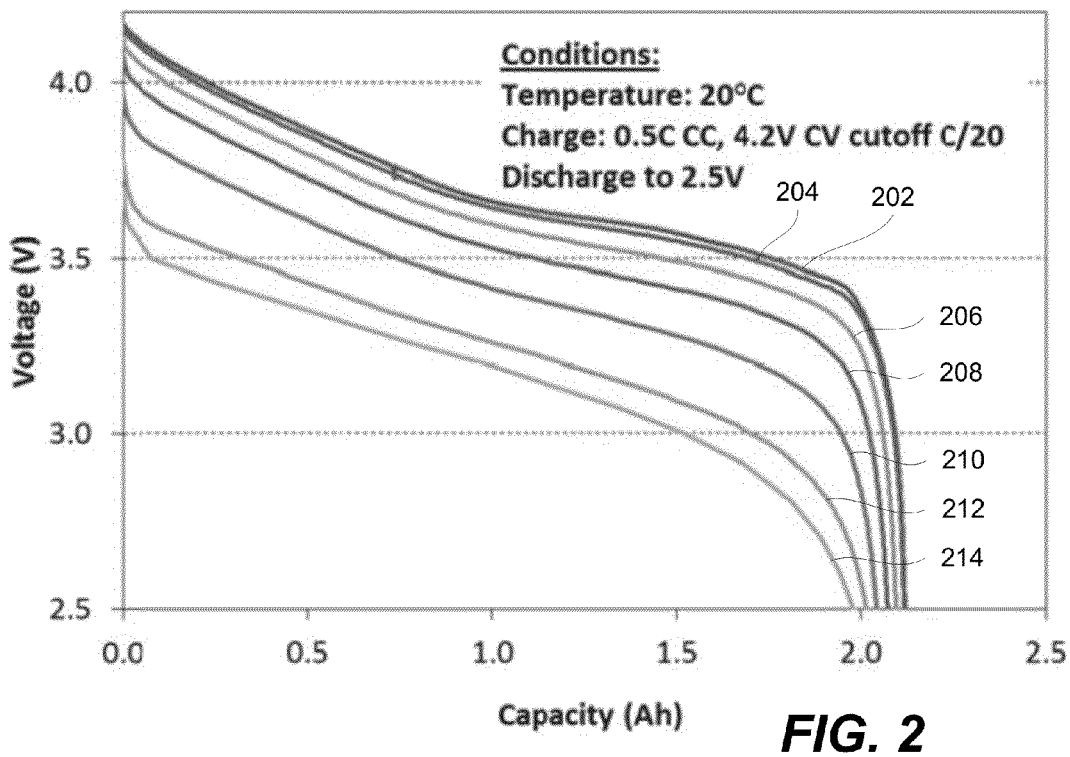
FIGS. 2-10 are experimental results for electrochemical cells built with electrolytes containing fluorinated solvents.

A separate set of NCM-graphite pouch cells with the fourth electrolyte (i.e., 0.8M LiBeti, 65% by weight of 1,1,1,2,2,3,4,5,5,5-decafluoro-3-methoxy-4-(trifluoromethyl)-pentane, 5% by weight of ethylene carbonate, 5% by weight of ethyl methyl carbonate, 17.5% by weight of ethyl propionate, and 7.5% by weight of a cyclic phosphazene; 2% by weight of vinyl carbonate was also added to this mixture) was subjected to cycle testing using different discharge rates and, separately, different temperatures. In both cases, the cells were charged at 0.5 C constant current to about 4.2V cutoff voltage and discharge to 2.5V. Discharge curves for the different discharge rate test are shown in FIG. 2, in which line 202 corresponds to 0.1 C discharge rate, line 204 corresponds to 0.2 C discharge rate, line 206 corresponds to 0.5 C discharge rate, line 208 corresponds to 1 C discharge rate, line 210 corresponds to 2 C discharge rate, line 212 corresponds to 4 C discharge rate, and finally line 214 corresponds to 5 C discharge rate. These discharge curves clearly show that the fourth electrolyte has good high discharge rate capabilities. The discharge shows that the rate capability of this battery is good and sufficient for many applications including hybrid and full electric vehicles. Unlike the cells filled with the baseline formulation of 1M LiPF$_6$/EC:DEC 1:2 2% VC, these cells passed the overcharge test with no flames. No constrains were used during overcharge test. The cells vented sparks and a short flash at high thermal runaway temperature of 200° C. Cells filled with 1M LiPF$_6$/EC:DEC 1:2 2% VC vented with sparks and flames at 188° C. No constrains were used during the heating test.

Figure 3:
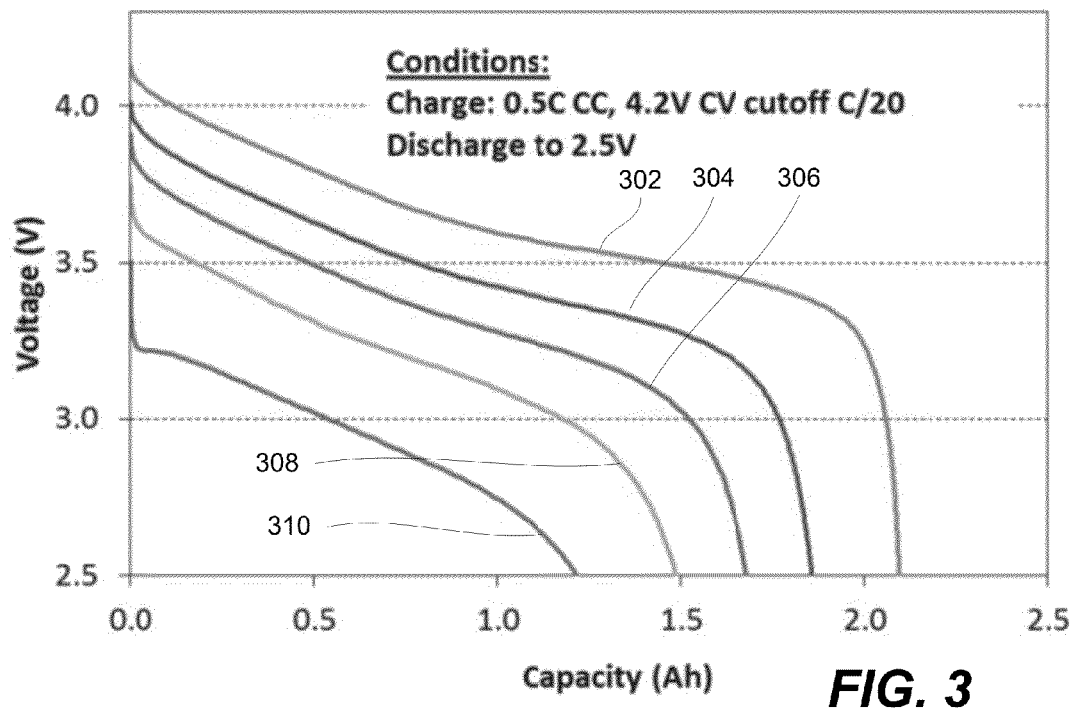

Discharge curves for the different temperature test are shown in FIG. 3. Specifically, line 302 corresponds to +20° C., line 304 corresponds to 0° C., line 306 corresponds to −10° C., line 308 corresponds to −20° C., and line 310 corresponds to −30° C. The fourth electrolyte performs well at low temperatures, which reflects its capabilities of maintaining a single phase during at these low temperatures. The decline in performance was attributed to an increased viscosity, which reduces mobility of lithium ions within the cells.

Figure 4:
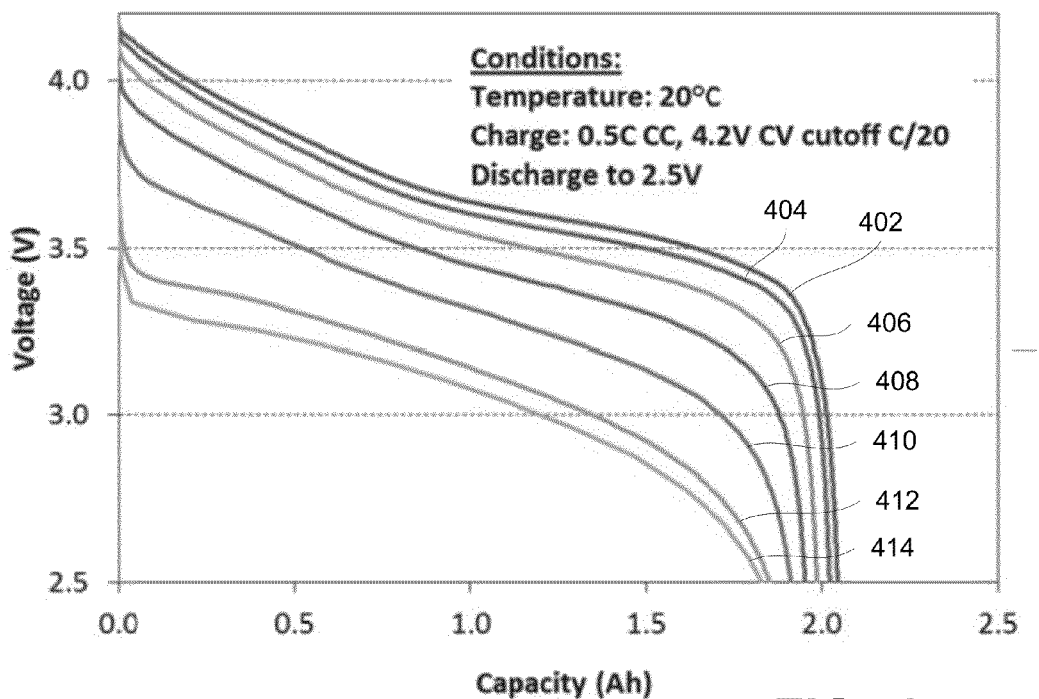

Another electrolyte formulation including 0.8M solution of LiBeti in HFE7600:EC:EP:Phosphazene at 70:5:15:10 by weight with 2% by weight of vinyl carbonate added was used in cells that were tested for different discharge rates and discharge at different temperatures. The test conditions were similar to the test described above. The results are presented in FIGS. 4 and 5. Specifically, FIG. 4 illustrates line 402 corresponds to 0.1 C discharge rate, line 404 corresponds to 0.2 C discharge rate, line 406 corresponds to 0.5 C discharge rate, line 408 corresponds to 1 C discharge rate, line 410 corresponds to 2 C discharge rate, line 412 corresponds to 4 C discharge rate, and finally line 414 corresponds to 5 C discharge rate. These discharge curves clearly show that this electrolyte also has good high discharge rate capabilities. Unlike the cells filled with the baseline formulation of 1M LiPF$_6$/EC:DEC 1:2 2% VC, these cells passed the overcharge test with no flames. The heating test was performed with constraining brass plates. The cells showed no thermal runaway and no sparks and flames up to 250° C.

Figure 5:
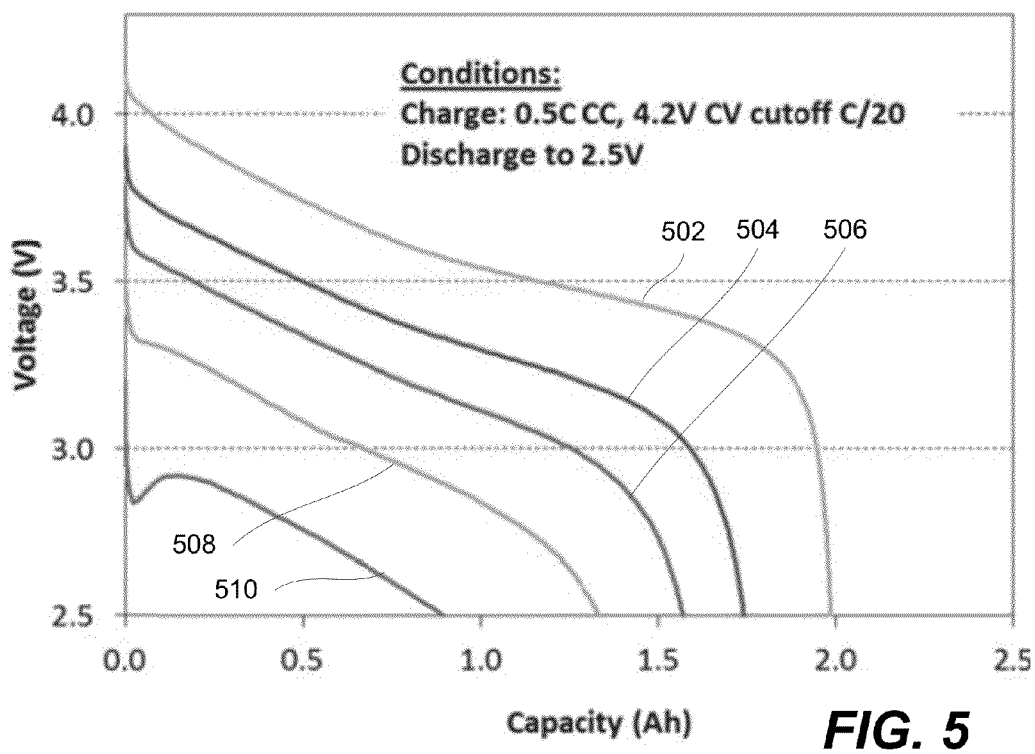

The results of discharge at different temperatures are shown in FIG. 5. Line 502 corresponds to +20° C., line 504 corresponds to 0° C., line 506 corresponds to −10° C., line 508 corresponds to −20° C., and line 510 corresponds to −30° C. The electrolyte performs well at low temperatures but not as good as, for example, the fourth electrolyte (i.e., 0.8M LiBeti, 65% by weight of 1,1,1,2,2,3,4,5,5,5-decafluoro-3-methoxy-4-(trifluoromethyl)-pentane, 5% by weight of ethylene carbonate, 5% by weight of ethyl methyl carbonate, 17.5% by weight of ethyl propionate, and 7.5% by weight of a cyclic phosphazene; 2% by weight of vinyl carbonate was also added to this mixture) describe above. However, the fact that the cells maintained at least 0.75 Ah capacity indicated that even this electrolyte is maintained at a substantially same phase at −30° C.

Another series of safety tests was performed on pouch cells fabricated with lithium nickel cobalt manganese (NCM) oxide used as a positive electrode material. Four different electrolytes were used. The first electrolyte included 0.8M LiBeti, 55% by weight of 1,1,1,2,2,3,4,5,5,5-decafluoro-3-methoxy-4-(trifluoromethyl)-pentane, and 45% by weight of methyl propionate. 10% by weight of a cyclic phosphazene and 2% by weight of vinyl carbonate were added to this mixture. The second electrolyte included 0.8M LiBeti, 50% by weight of 1,1,1,2,2,3,4,5,5,5-decafluoro-3-methoxy-4-(trifluoromethyl)-pentane, 5% by weight of ethylene carbonate, 5% by weight of P14Beti ionic liquid, 30% by weight of methyl propionate, and 10% by weight of a cyclic phosphazene. The third electrolyte included 1.0M of LiPF$_6$ mixed in a 1:2 weight ratio of ethylene carbonate and diethyl carbonate. 2% by weight of vinyl carbonate was added to this mixture. The fourth electrolyte included 0.8M LiBeti, 32.5% by weight of 1,1,1,2,2,3,4,5,5,5-decafluoro-3-methoxy-4-(trifluoromethyl)-pentane, 32.5% by weight of 1,1,1,2,3-hexafluoro-4-(1,1,2,3,3,3-hexafluoropropoxy)-pentane, 4.5% by weight of ethylene carbonate, 5% by weight of ethyl methyl carbonate, 17.5% by weight of ethyl propionate, 7.5% by weight of a cyclic phosphazene, and 0.5% of hexamethyldisilazane (HMDS). 2% by weight of vinyl carbonate was also added to this mixture. The results of these tests are presented in the following table.

TABLE

Safety Test Results of Cells Built with NCM electrodes

| Test | First Electrolyte | Second Electrolyte | Third Electrolyte | Fourth Electrolyte |
|---|---|---|---|---|
| Heating | Swelling | Swelling | Max Temp = 190° C.; Flames | Swelling and Rupturing |
| Overcharge | Swelling and Rupturing | Swelling | Swelling | Swelling |
| Nail | No event | No event | No event | No event |

These safety test results indicate that at least partially replacing non-fluorinated solvent with fluorinated ones improves safety of the cells. For example, the NCM cell with fluorinated solvents did not experience any flaming during the overcharge tests. The cells show good safety performance under the tested conditions.

Figure 6:
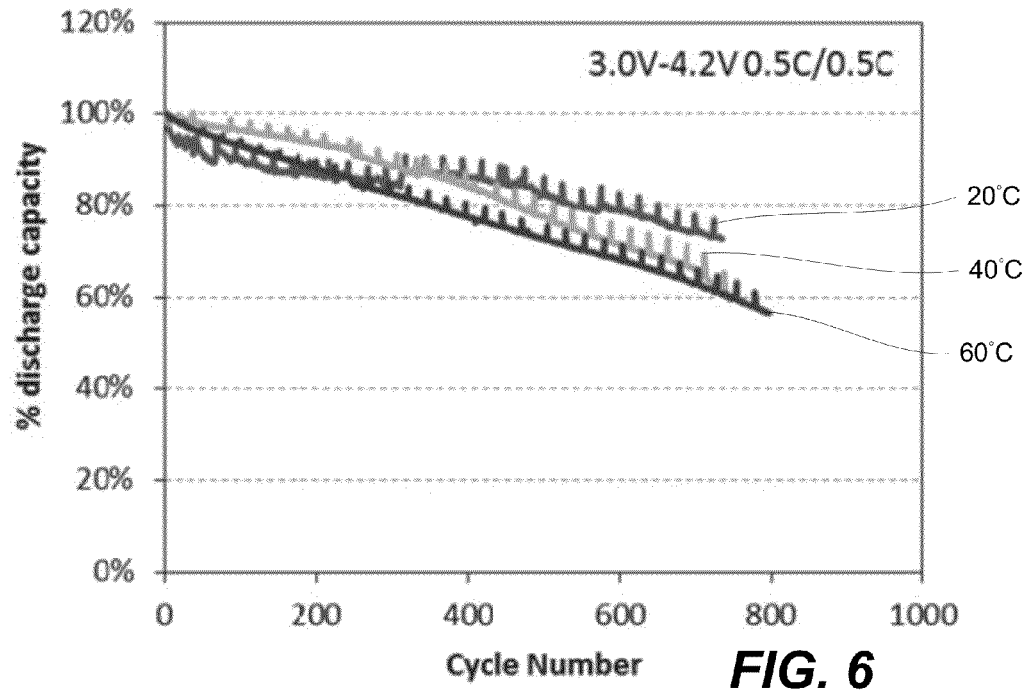
Figure 7:
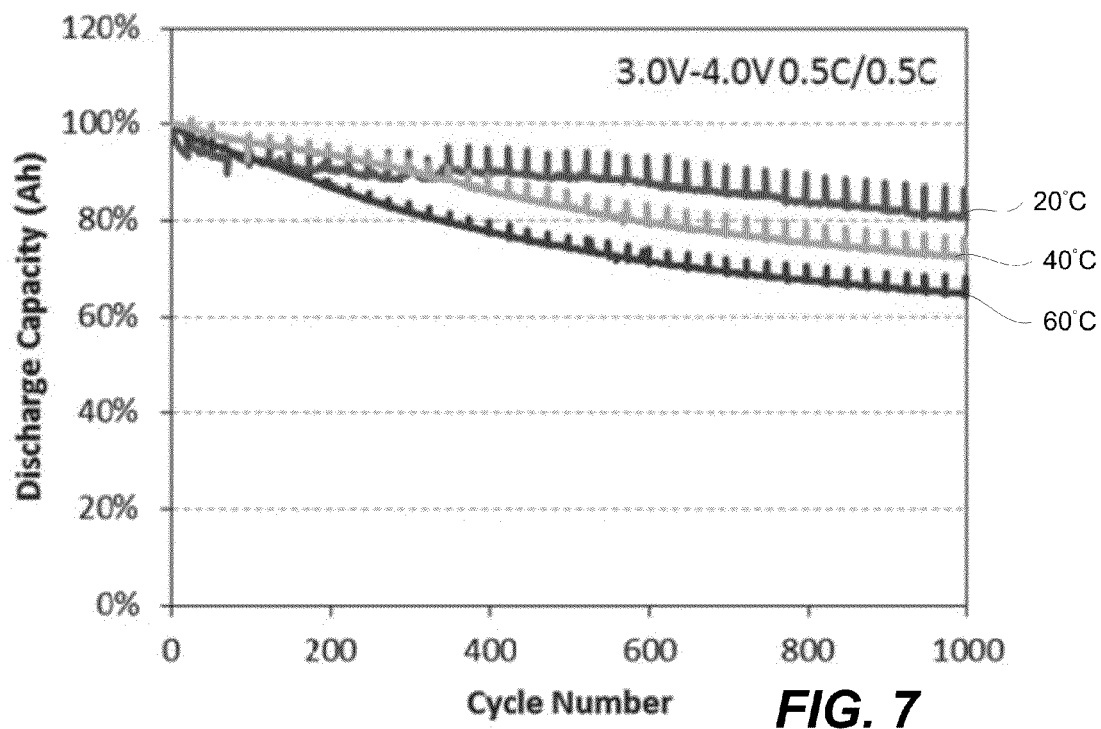
Figure 8:
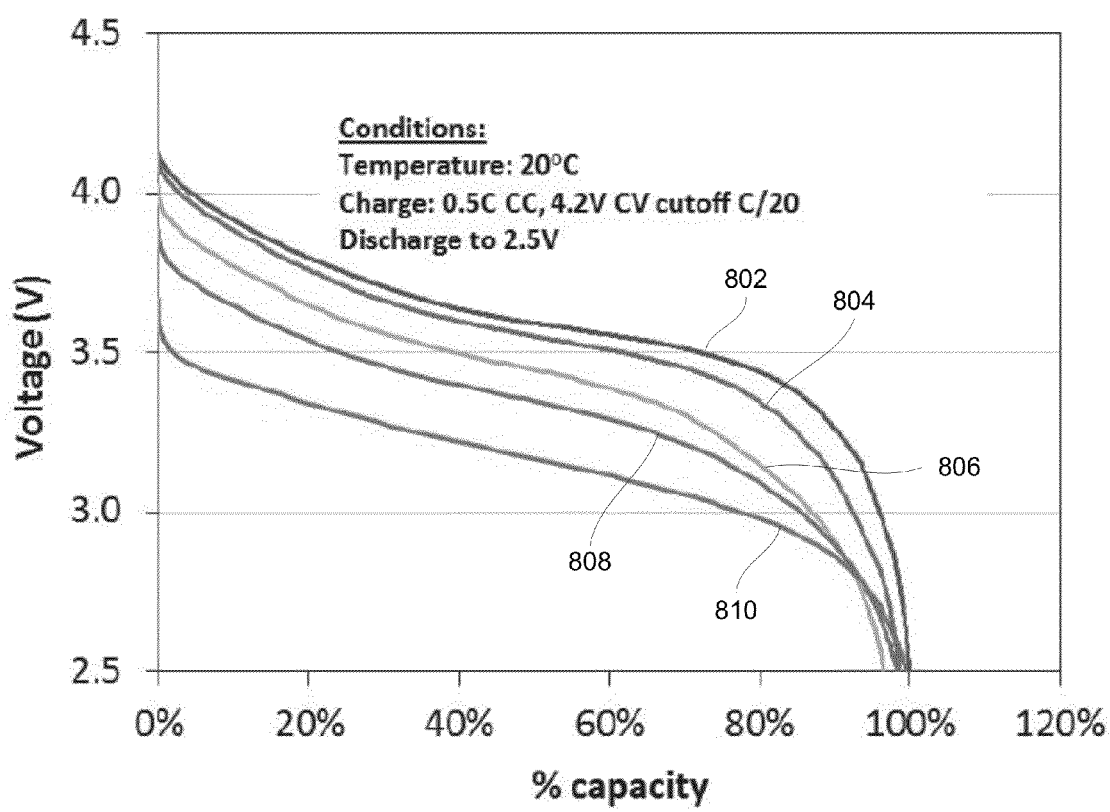

The cycling data at three different temperatures of the cells build with the first electrolyte (i.e., 0.8M LiBeti, 55% by weight of 1,1,1,2,2,3,4,5,5,5-decafluoro-3-methoxy-4-(trifluoromethyl)-pentane, and 45% by weight of methyl propionate with 10% by weight of a cyclic phosphazene and 2% by weight of vinyl carbonate added to this mixture) are presented in FIG. 6 for 4.2V cutoff voltage and in FIG. 7 for 4.0V cutoff voltage. Specifically, the cells cycled at 20° C. up to 4.0V retained over 80% of their capacity after 1000 cycles. Cells built with this electrolyte were also tested at different discharge rates with results presented in FIG. 8. Line 802 represents a discharge at 0.1 C, line 804 represents a discharge at 0.2 C, line 806 represents a discharge at 0.5 C, line 808 represents a discharge at 1 C, and line 810 represents a discharge at 2 C. The cells performed relative well at high discharge rates.

Figure 9:
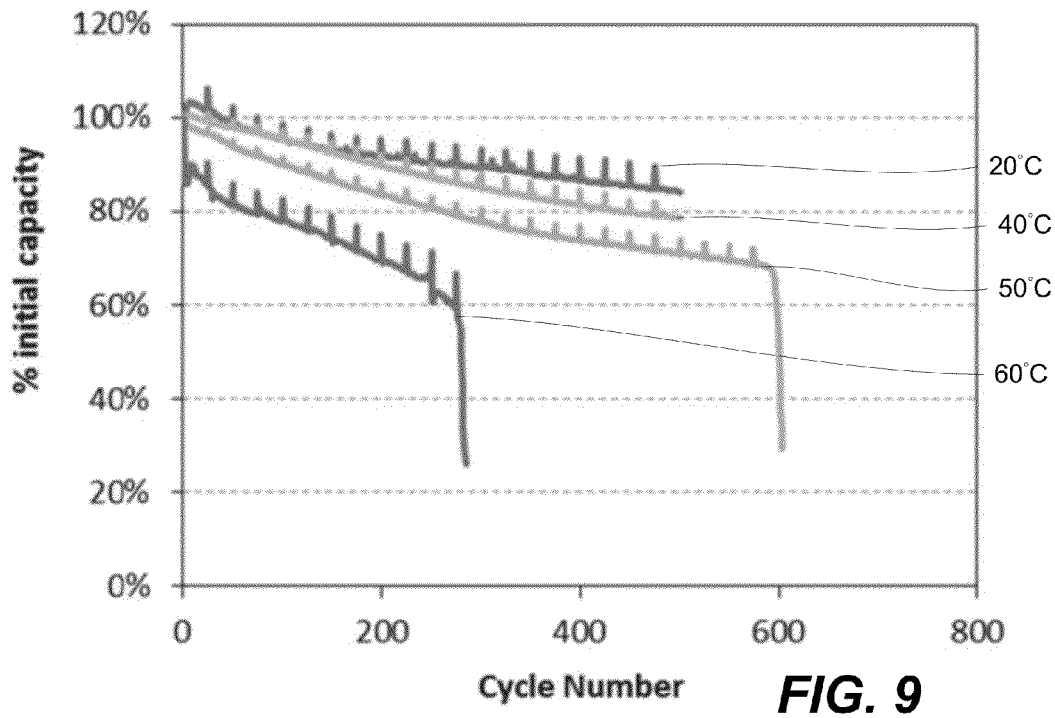
Figure 10:
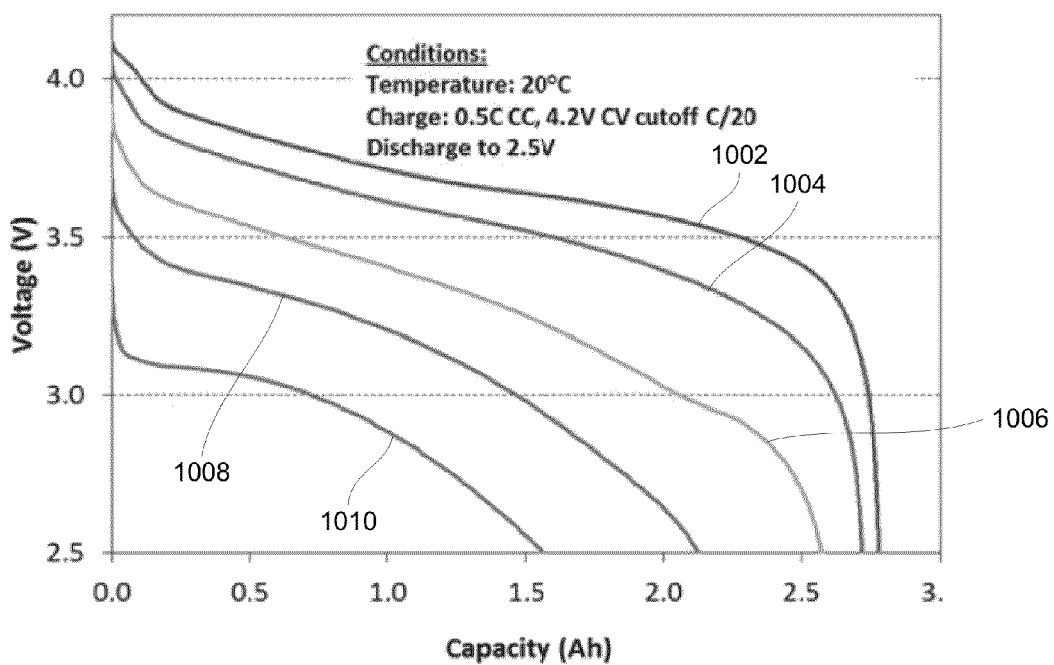

The cycling data at three different temperatures of the cells build with the fourth electrolyte (0.8M LiBeti, 32.5% by weight of 1,1,1,2,2,3,4,5,5,5-decafluoro-3-methoxy-4-(trifluoromethyl)-pentane, 32.5% by weight of 1,1,1,2,3-hexafluoro-4-(1,1,2,3,3,3-hexafluoropropoxy)-pentane, 4.5% by weight of ethylene carbonate, 5% by weight of ethyl methyl carbonate, 17.5% by weight of ethyl propionate, 7.5% by weight of a cyclic phosphazene, and 0.5% of hexamethyldisilazane (HMDS) and 2% by weight of vinyl carbonate was also added) is presented in FIG. 9. The cells cycled retained over 80% of their capacity after about 500 cycles at 20° C. and 40° C. Cells built with this electrolyte were also tested at different discharge rates with results presented in FIG. 10. Line 1002 represents a discharge at 0.1 C, line 1004 represents a discharge at 0.2 C, line 1006 represents a discharge at 0.5 C, line 1008 represents a discharge at 1 C, and line 1010 represents a discharge at 2 C. The cells performed relative well at high discharge rates.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. An electrolyte for use in an electrochemical cell, the electrolyte comprising:
    a low molecular weight first electrolyte salt having a high salt concentration of at least 0.5 M and a molecular weight less than about 250 grams per mole, wherein the first electrolyte salt comprises one of $LiPF_6$, $LiBF_4$, $LiClO_4$, LiBOB, or $LiN(SO_2F)_2$;
    a non-fluorinated linear carboxylic acid ester; and
    one or more fluorinated solvents to include 1,1,1,2,3,3-hexafluoro-4-(1,1,2,3,3,3-hexafluoropropoxy)-pentane, the one or more fluorinated solvents being over 30% by weight of the electrolyte, excluding any electrolyte salt;
    wherein the low molecular weight first electrolyte salt at the high salt concentration is soluble in the electrolyte; and
    wherein the electrolyte is a one-phase solution at a temperature of about −30° C.

2. The electrolyte according to claim 1, wherein the one or more fluorinated solvents further includes 1-methoxyheptafluoropropane, methyl nonafluorobutyl ether, ethyl nonafluorobutyl ether, 1,1,1,2,2,3,4,5,5,5-decafluoro-3-methoxy-4-(trifluoromethyl)-pentane, and/or 3-ethoxy-1,1,1,2,3,4,4,5,5,6,6,6-dodecafluoro-2-trifluoromethyl-hexane.

3. The electrolyte according to claim 2, wherein a concentration of the 1-methoxyheptafluoropropane, methyl nonafluorobutyl ether, ethyl nonafluorobutyl ether, 1,1,1,2,2,3,4,5,5,5-decafluoro-3-methoxy-4-(trifluoromethyl)-pentane, and/or 3-ethoxy-1,1,1,2,3,4,4,5,5,6,6,6-dodecafluoro-2-trifluoromethyl-hexane is less than a concentration of 1,1,1,2,3,3-hexafluoro-4-(1,1,2,3,3,3-hexafluoropropoxy)-pentane.

4. The electrolyte according to claim 2, wherein the one or more fluorinated solvents are between 30% and 80% by weight of the electrolyte excluding any electrolyte salt.

5. The electrolyte according to claim 1, further comprising a second electrolyte salt,
    different from the first electrolyte salt and having a lower concentration than the first electrolyte salt,
    the second electrolyte salt comprising at least one carbon atom and at least two fluorine atoms per formula unit and selected from the group consisting of:
    i) a fluoroalkyl-substituted $LiPF_6$ salt having a general structure $LiPF_xR_{1-x}$, where x is from 1 to 5 and at least one R is a fluorinated alkyl group of 1 to 8 carbon atoms;
    ii) a fluoroalkyl-substituted $LiBF_4$ salt having a general structure $LiBF_xR_{1-x}$, where x is from 1 to 4 and at least one R is a fluorinated alkyl group of 1 to 8 carbon atoms;
    iii) a linear imide salt having a general structure $LiN(-SO_2-R)_2$, where at least one R is a fluorinated alkyl group of 1 to 8 carbon atoms;
    iv) a cyclic imide salt having a general structure $LiN(-SO_2-R-)$, where R is a fluorinated alkyl group of 1 to 8 carbon atoms; and
    v) a methide salt having a general structure $LiC(-SO_2-R)_3$, where at least one R is fluorinated alkyl group of 1 to 8 carbon atoms.

6. The electrolyte according to claim 5, wherein the second electrolyte salt comprises one of $LiN(SO_2CF_2CF_3)_2$, $LiN(SO_2CF_3)_2$, $LiN(SO_2F)_2$, $LiC(SO_2CF_3)_3$, or $LiC(SO_2CF_2CF_3)_3$.

7. The electrolyte according to claim 5, wherein the second electrolyte salt comprises $LiN(SO_2CF_2CF_3)_2$.

8. The electrolyte according to claim 1, wherein the non-fluorinated carboxylic acid ester includes methyl acetate, ethyl acetate, methyl propionate, ethyl propionate, methyl butyrate, and/or ethyl butyrate.

9. The electrolyte according to claim 1, further comprising a flame-retardant additive at a concentration of about 1% to about 10% by weight of the electrolyte excluding any electrolyte salt.

10. The electrolyte according to claim 9, wherein the flame-retardant additive comprises a phosphate, phosphite, phosphine, and/or phosphazene.

11. The electrolyte according to claim 9, wherein the flame-retardant additive comprises $P_3N_3F_x(OR)_{6-x}$ such that R is an aryl group or an alkyl group of 1 to 12 carbon atoms, and x is from 1 to 6.

12. The electrolyte according to claim 9, wherein the flame-retardant additive comprises a cyclic phosphazene.

13. The electrolyte according to claim 1, further comprising an ionic liquid at about 1% to about 25% by weight of the electrolyte.

14. The electrolyte according to claim 13, wherein the ionic liquid comprises one or more of a pyridinium, piperidinium, imidazolium, and phosphonium cations.

15. An electrolyte for use in an electrochemical cell, the electrolyte comprising:
    a low molecular weight first electrolyte salt having a high salt concentration of at least 0.5 M and a molecular weight less than about 250 grams per mole, wherein the first electrolyte salt comprises one of $LiPF_6$, $LiBF_4$, $LiClO_4$, LiBOB, or $LiN(SO_2F)_2$;
    one or more fluorinated solvents to include 1,1,1,2,3,3-hexafluoro-4-(1,1,2,3,3,3-hexafluoropropoxy)-pentane, the one or more fluorinated solvents being over 30% by weight of the electrolyte, excluding the electrolyte salt;
    one of ethyl butyrate or ethyl propionate at about 10% to 30% by weight of the electrolyte, excluding any electrolyte salt; and
    a cyclic phosphazene at between about 5% and 15% by weight of the electrolyte, excluding any electrolyte salt,
    wherein the low molecular weight first electrolyte salt at the high salt concentration is soluble in the electrolyte; and
    wherein the electrolyte is a one-phase solution at a temperature of about −30° C.

16. An electrochemical cell comprising:
    a positive electrode;
    a negative electrode;
    an electrolyte providing ionic exchange between the positive electrode and negative electrode and comprising:
        a low molecular weight first electrolyte salt having a high salt concentration of at least 0.5 M and a molecular weight less than about 250 grams per mole, wherein the first electrolyte salt comprises one of $LiPF_6$, $LiBF_4$, $LiClO_4$, LiBOB, or $LiN(SO_2F)_2$;
        a non-fluorinated carboxylic acid ester; and one or more fluorinated solvents to include 1,1,1,2,3,3-hexafluoro-4-(1,1,2,3,3,3-hexafluoropropoxy)-pentane, the one or more fluorinated solvents being over 30% by weight of the electrolyte, excluding any electrolyte salt;

wherein the low molecular weight first electrolyte salt at the high salt concentration is soluble in the electrolyte; and wherein the electrolyte is a one-phase solution at a temperature of about −30° C.

17. The electrolyte according to claim 1, wherein the non-fluorinated carboxylic acid ester includes methyl butyrate and/or ethyl butyrate.

18. The electrolyte according to claim 1 wherein the electrolyte includes 10% or less non-fluorinated cyclic carbonate ester by weight, excluding any electrolyte salt.

19. The electrolyte according to claim 1 wherein the electrolyte includes about 7% non-fluorinated cyclic carbonate ester by weight, excluding any electrolyte salt.

20. The electrolyte according to claim 1 wherein the electrolyte includes about 5% non-fluorinated cyclic carbonate ester by weight, excluding any electrolyte salt.

21. The electrolyte according to claim 1 wherein the electrolyte includes substantially no non-fluorinated cyclic carbonate ester.

* * * * *